(12) United States Patent
Tokita

(10) Patent No.: US 6,383,446 B1
(45) Date of Patent: May 7, 2002

(54) METHOD AND SYSTEM FOR AUTOMATIC ELECTRICAL SINTERING

(75) Inventor: Masao Tokita, Tokyo (JP)

(73) Assignee: Sumitomo Coal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/538,474

(22) Filed: Mar. 30, 2000

(30) Foreign Application Priority Data

Mar. 31, 1999 (JP) .......................................... 11-093345
Mar. 9, 2000 (JP) ...................................... 2000-065369

(51) Int. Cl.[7] ................................................ B22F 3/12
(52) U.S. Cl. ............................... 419/38; 419/6; 419/54; 425/78

(58) Field of Search ............................... 419/38, 54, 6; 425/78

(56) References Cited

U.S. PATENT DOCUMENTS 3,656,946 A * 4/1972 Inque et al. .................. 75/226
3,873,805 A * 3/1975 Inoue .......................... 219/149
4,273,581 A * 6/1981 Inoue .......................... 75/214
4,536,366 A * 8/1985 Inoue .......................... 419/11

* cited by examiner

*Primary Examiner*—Daniel J. Jenkins
(74) *Attorney, Agent, or Firm*—Sughrue Mion, PLLC

(57) ABSTRACT

The present invention is a method of automatically loading powder material into a sintering mold and subsequently effecting electrical sintering to the powder material in the sintering mold.

20 Claims, 29 Drawing Sheets

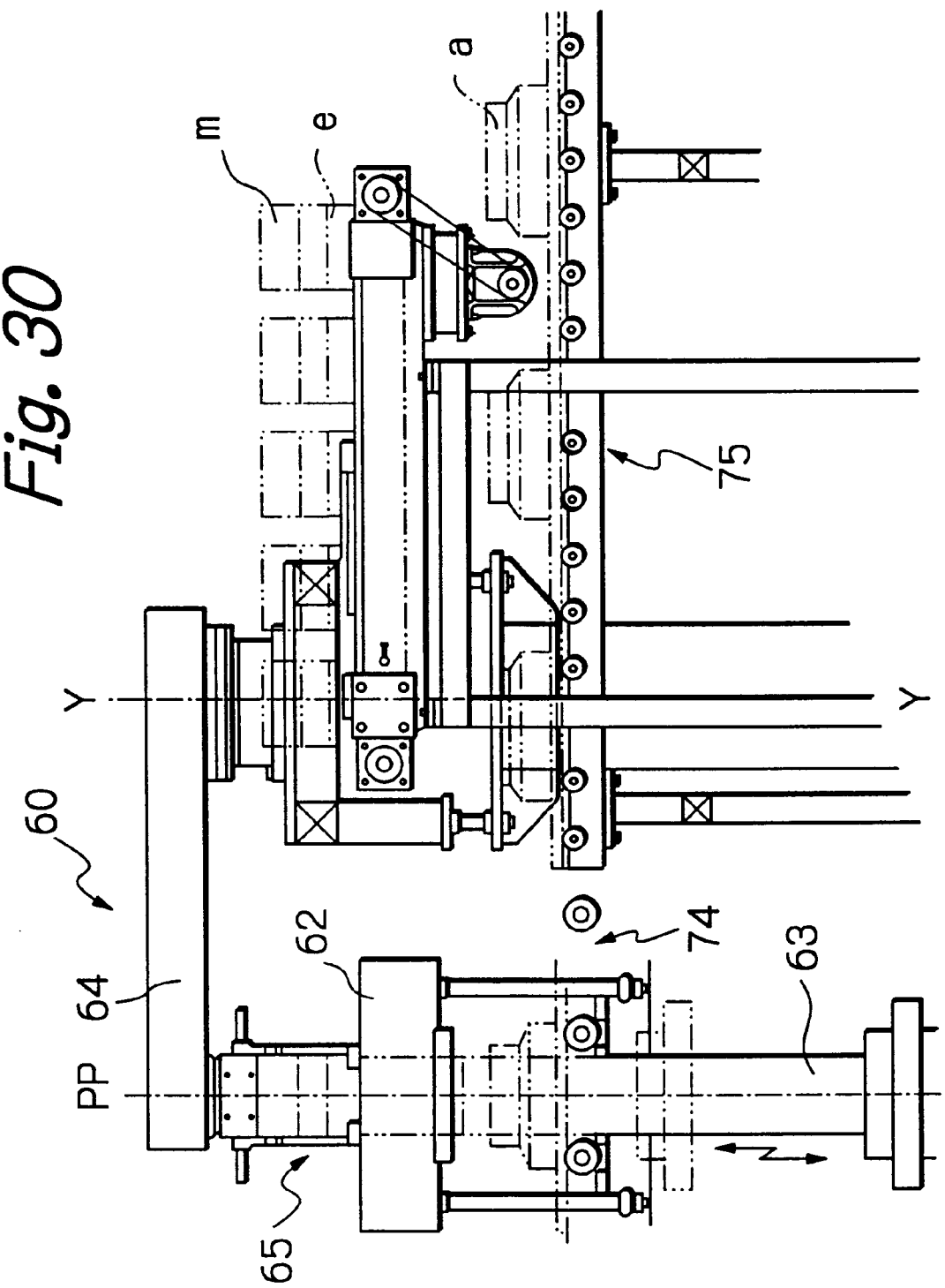

METHOD AND SYSTEM FOR AUTOMATIC ELECTRICAL SINTERING

BACKGROUND OF THE INVENTION

The present invention generally relates to a method and system for automatic electrical sintering and, more particularly, to such method and system for automatically loading powder material into a sintering mold and subsequently effecting electrical sintering to the powder material in the sintering mold in a continuous fabrication process.

There have been provided various electrical sintering technologies; however, they require relatively long time to complete the sintering process, so there has not been proposed an idea of a continuous fabrication process for obtaining sintered products, including the steps of: loading an amount of powder material into a sintering mold; effecting electrical sintering to the powder material in the sintering mold; and removing the sintered product from the sintering mold. As the result, there has not been provided a system for carrying out electrical sintering process in a fully automated manner and in a continuous fabrication process.

Recently, many improvements has been made in electrical sintering methods. For example, Pulsed Current Energizing Sintering (or Pulsed Electric Current Sintering) method using a pulsed current and including Spark-Plasma Sintering, Electric-Discharge Sintering and Plasma-Activated Sintering methods proposed by the applicant of this application has been improved. According to the improved Pulsed Current Energizing Sintering, sintering time is drastically shortened. Such shorter sintering time provides the possibility of realizing a continuous fabrication process for obtaining sintered products, including the above mentioned steps.

In addition, by virtue of newer electrical sintering methods, such as those mentioned above, materials that were difficult to bond together through any older methods can be now bonded together with ease into a unitary sintered product. Examples of such materials are: a stainless steel vs. copper; a ceramic vs. a metal; etc. Such a unitary sintered product of two different powder materials may be fabricated to have two-layered structure composed of two layers bonded together and each made of a pure powder material; however, the characteristics of such a sintered product can be improved by adding at least one middle layer to create such multi-layered structure in that the middle layer is made of a mixture of the two powder materials. Further, such multi-layered structure may be also used advantageously for a sintered product including three or more layers made of respective powder materials which are identical in composition and differ from one another only in particle size, wherein the powder materials for the layers have their particle sizes gradually increasing from the layer on one side of the product toward the other side. Such a sintered product may have gradient functionality (i.e., the gradual variation in properties of the sintered product from one side of the product to the other) so as to achieve more improved characteristics. In order to fabricate a sintered product having gradient functionality, it is required to load different powder materials, which differ from one another in at least one of properties including component(s) of powder material, percentages of components, particle size and particle shape, into a sintering mold so as to form corresponding powder layers of desired thickness' with precision. However, there has not been proposed a system for automatically loading different powder materials into a sintering mold in the form of a plurality of layers including respective layers of the different powder materials and subsequently effecting electrical sintering to the powder material in the sintering mold.

SUMMARY OF THE INVENTION

In view of the foregoing, it is an object of the resent invention to provide a method and system for automatically loading powder material into a sintering mold and subsequently effecting electrical sintering to the powder material in the sintering mold in a continuous fabrication process.

It is another object of the present invention to provide a method and system for automatically loading different powder materials, which differ from one another in at least one of properties including component(s) of powder material, percentages of components, particle size and particle shape, into a sintering mold in the form of a plurality of layers including respective layers of the different powder materials and subsequently effecting electrical sintering to the powder materials in the sintering mold in a continuous fabrication process.

It is a further object of the present invention to provide a method and system for automatically loading powder material into a sintering mold and subsequently effecting electrical sintering to the powder material in the sintering mold, in which high-quality sintered-products may be fabricated in an automated manner and in a continuous fabrication process, by pressing at a desired pressure the powder material filled into the sintering mold.

It is a still further object of the present invention to provide a method and system for automatically loading powder material into a sintering mold and subsequently effecting electrical sintering to the powder material in the sintering mold, in which high-quality sintered products may be fabricated in an automated manner and in a continuous fabrication process, by carrying out pre-heating, sintering and cooling steps within individual, substantially gas-tight chambers for the respective steps isolated from the environment and by individually controlling atmospheres in the chambers.

In accordance with an aspect of the present invention, there is provided a method of automatically loading powder material into a sintering mold and subsequently effecting electrical material to the powder compact in the sintering mold, the method comprising the steps of: fitting a lower press core into a bore formed in the sintering mold, while allowing displacement of the lower press core in the bore; filling different powder materials, which differ from one another in at least one of properties including component(s) of powder material, percentages of components, particle size and particle shape, into the bore to form respective powder layers of the different powder materials in the bore, while displacing the lower press core downward in the bore sequentially and in a stepwise manner, such that the position of a top surface of the lower press core from a top surface of the sintering mold is adjusted depending on the thickness of the respective layers of the different powder materials being filled into the bore; preliminarily pressing at a desired pressure the powder layers of the different powder materials; displacing the pressed powder layers together with the lower press core relative to the sintering mold so as to position the powder layers to a desired position in the sintering mold; fitting an upper press core into the bore of the sintering mold and onto the powder layers; pre-heating to a desired temperature the sintering mold with the powder layers formed therein and with the upper press core fitted therein; and effecting electrical sintering to the powder layers. The last step is carried out by: operating upper and lower conductive members so as to press at a desired pressure the upper press core and the lower press core fitted in the sintering mold having been pre-heated; and simultaneously applying sintering current to the powder layers through the upper and lower conductive members.

In a preferred embodiment of the present invention, the pressing step may be carried out either each time when one of the different powder materials is filled into the sintering mold to form one of the layers, or each time when successive two or more of the different powder materials are filled into the sintering mold to form two or more of the layers. Further, the method may further comprise the step of effecting forced cooling to the sintering mold subsequent to the electrical sintering step.

In another preferred embodiment of the present invention, the pre-heating step may comprise applying pre-heating current to the sintering mold. Also, the sintering current applying step may comprise: causing the lower conductive member to come into contact with only a bottom surface of the lower press core; and applying DC pulsed current to the powder compact through the upper and lower conductive members. Alternatively, the sintering current applying step may comprise: causing the lower conductive member to come into contact with a bottom surface of the lower press core and a bottom surface of the sintering mold; and applying DC pulsed current to the powder compact through the upper and lower conductive members.

In accordance with another aspect of the present invention, there is provided an automatic electrical sintering system for automatically loading powder material into a sintering mold and subsequently effecting electrical sintering to the powder material in the sintering mold, comprising: an automatic powder material loading apparatus for automatically loading a desired amount of powder material into the sintering mold and pressing the powder material: a pre-heating unit disposed along a transportation path of the sintering mold and downstream of the automatic powder material loading apparatus, for pre-heating the sintering mold; a sintering unit including conductive members capable of contact with a pair of press cores fitted in the sintering mold pre-heated by the pre-heating unit, with the powder material being held between the press cores, the sintering unit applying sintering current to the powder material through the plunger conductive members to effect electrical sintering to the powder material in the sintering mold; and a conveyor for conveying through the sintering unit the sintering mold sent from the automatic powder material loading apparatus. Further, the sintering unit includes a substantially gas-tight chamber.

In a preferred embodiment of the present invention, the pre-heating unit may be disposed in the chamber of the sintering unit, and the chamber of the sintering unit may have an atmosphere therein which is controllable to be selectively one of atmospheres including a pre-heating atmosphere and a sintering atmosphere. Alternatively, the pre-heating unit may include its own chamber, and the chamber of the sintering unit and the chamber of the pre-heating unit may have respective atmospheres therein which are individually controllable. Further, the automatic electrical sintering system may further comprise a cooling unit for effecting forced cooling to the sintering mold having been subjected to sintering process, wherein the cooling unit includes its own chamber.

In another preferred embodiment of the present invention, each of the chambers may include an entrance and an exit for the sintering mold to be conveyed therethrough into and out of that chamber; wherein each of the entrance and the exit is provided with a gate for isolating the inside of that chamber from the outside of that chamber. Further, the automatic powder material loading apparatus may serve to fill different powder materials, which differ from one another in at least one of properties including component(s) of powder material, percentages of components, particle size and particle shape, into the bore of the sintering mold to form respective layers of the different powder materials one on another in the sintering mold. In addition, the automatic powder material loading apparatus may comprise: a conveyor system for conveying the sintering mold; a powder filling mechanism for filling an amount of powder material into the sintering mold at a powder filling position defined along a transportation path of the sintering mold conveyed by the conveyor system; and a press unit for pressing at a desired pressure the amount of powder material in the sintering mold; wherein a plurality of the powder filling mechanisms are provided along the transportation path, each having the powder filling position. Alternatively, the automatic powder material loading apparatus may comprise: a conveyor system for conveying the sintering mold; a powder filling mechanism for filling an amount of powder material into the sintering mold at a powder filling position defined along a transportation path of the sintering mold conveyed by the conveyor system; and a press unit for pressing at a desired pressure the amount of powder material in the sintering mold; wherein the powder filling mechanism comprises: a rotary table capable of indexing movement about an axis; and a plurality of hoppers provided on the rotary table at circumferentially spaced positions with respect to the axis of the rotary table. The plurality of hoppers stores the different powder materials therein, respectively, and is capable of individual movement relative to the rotary table. One of the plurality of hoppers is brought to the powder filling position by indexing movement of the rotary table.

In a further preferred embodiment of the present invention, the pre-heating unit may comprise a pair of electrical contacts capable of selective contact with outer side surface of the sintering mold, wherein pre-heating current is applied to the sintering mold through the electrical contacts. Also, the pair of press cores may include an upper press core and a lower press core, wherein the pair of conductive members may include an upper conductive member and a lower conductive member, and wherein the lower conductive member may be capable of contact with only the lower press core fitted in the sintering mold. Alternatively, the pair of press cores may include an upper press core and a lower press core, wherein the pair of conductive members may include an upper conductive member and a lower Conductive member, and wherein the lower conductive member may be capable of contact with a bottom surface of the sintering mold and a bottom surface of the lower press core fitted in the sintering mold. In addition, the automatic electrical sintering system may further comprise a pushing-out unit for pushing out and removing the upper press core, the lower press core and a sintered product at once from the sintering mold having been subjected to sintering process.

In accordance with a further aspect of the present invention, there is provided an automatic electrical sintering system for automatically loading powder material into a sintering mold and subsequently effecting electrical sintering to the powder material in the sintering mold, comprising: an automatic powder material loading apparatus for automatically loading a desired amount of powder material into the sintering mold and pressing the powder material; a sintering unit disposed along a transportation path of the sintering mold and downstream of the automatic powder material loading apparatus and including conductive members capable of contact with a pair of press cores fitted in the sintering mold, with the powder material being held between the press cores, the sintering unit applying sintering current to the powder compact through the conductive members to effect electrical sintering to the powder compact in the sintering mold; a conveyor for conveying through the sintering unit the sintering mold sent from the automatic powder material loading apparatus; a sintering power supply for providing sintering current; and a pre-heating power supply for providing pre-heating current. The conductive members are capable of selective electrical connection to the sintering power supply and the pre-heating power supply, so that the pre-heating current and the sintering current is selectively applicable to the sintering mold through the conductive members. Further, the sintering unit includes a substantially gas-tight chamber having an atmosphere therein which is controllable to be selectively one of atmospheres including a pre-heating atmosphere and a sintering atmosphere.

BRIEF DESCRIPTION OF THE DRAWINGS

The above and other objects, features and advantages of the present invention will be apparent from the following detailed description of preferred embodiments thereof, reference being made to the accompanying drawings, in which:

FIG. 30 is a side elevation view of a pushing-out unit;

DETAILED DESCRIPTION OF THE INVENTION

With reference now to the accompanying drawings, preferred embodiments of the present invention will be described in detail.

Figure 1:
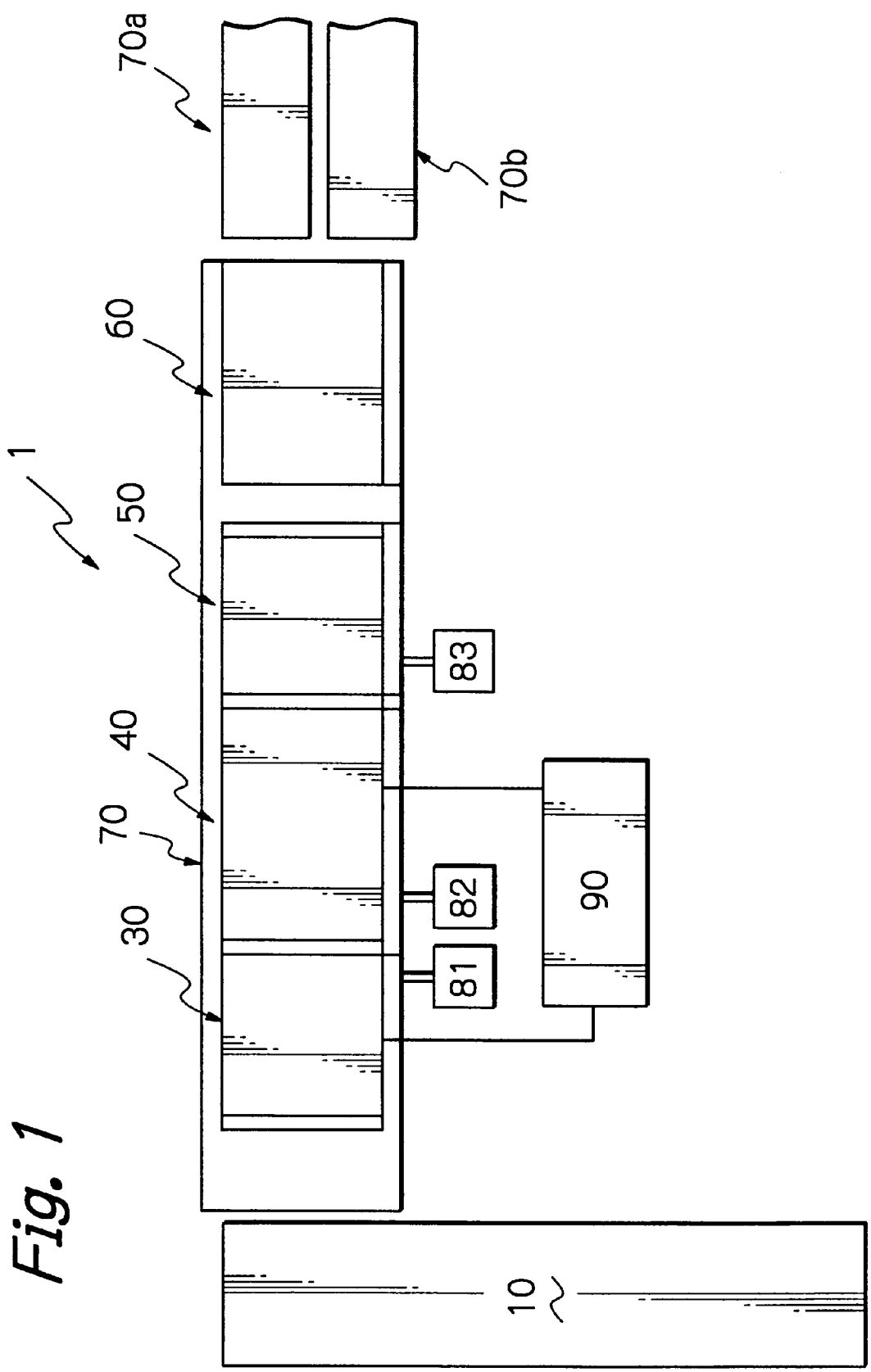
FIG. 1 is a schematic plan view of an automatic electrical sintering system, constructed and arranged in accordance with the present invention.

FIG. 1 schematically shows the arrangement of the whole of an automatic electrical sintering system, constructed and arranged in accordance with a first embodiment of the present invention. The automatic electrical sintering system 1 includes: an automatic powder material loading apparatus 10 for automatically loading powder material into a sintering mold; a pre-heating unit 30 for pre-heating the sintering mold having the powder material loaded therein; a sintering unit 40; a cooling unit 50 for cooling the sintering mold having been subjected to the sintering process; a pushing-out unit 60 for pushing out and removing a sintered product from the sintering mold after the latter has been cooled; a roller conveyor 70 for conveying a tray having the sintering mold place thereon from a sending position of the automatic powder material loading apparatus 10 to the pushing-out unit 60; first, second and third atmosphere control units 81, 82 and 83 for controlling atmospheres in the pre-heating unit 30, the sintering unit 40 and the cooling unit 50, respectively; and a power supply unit 90 for supplying electrical power to the pre-heating unit 30 and the sintering unit 40, all of which are laid out in the arrangement shown in FIG. 1.

Figure 2:
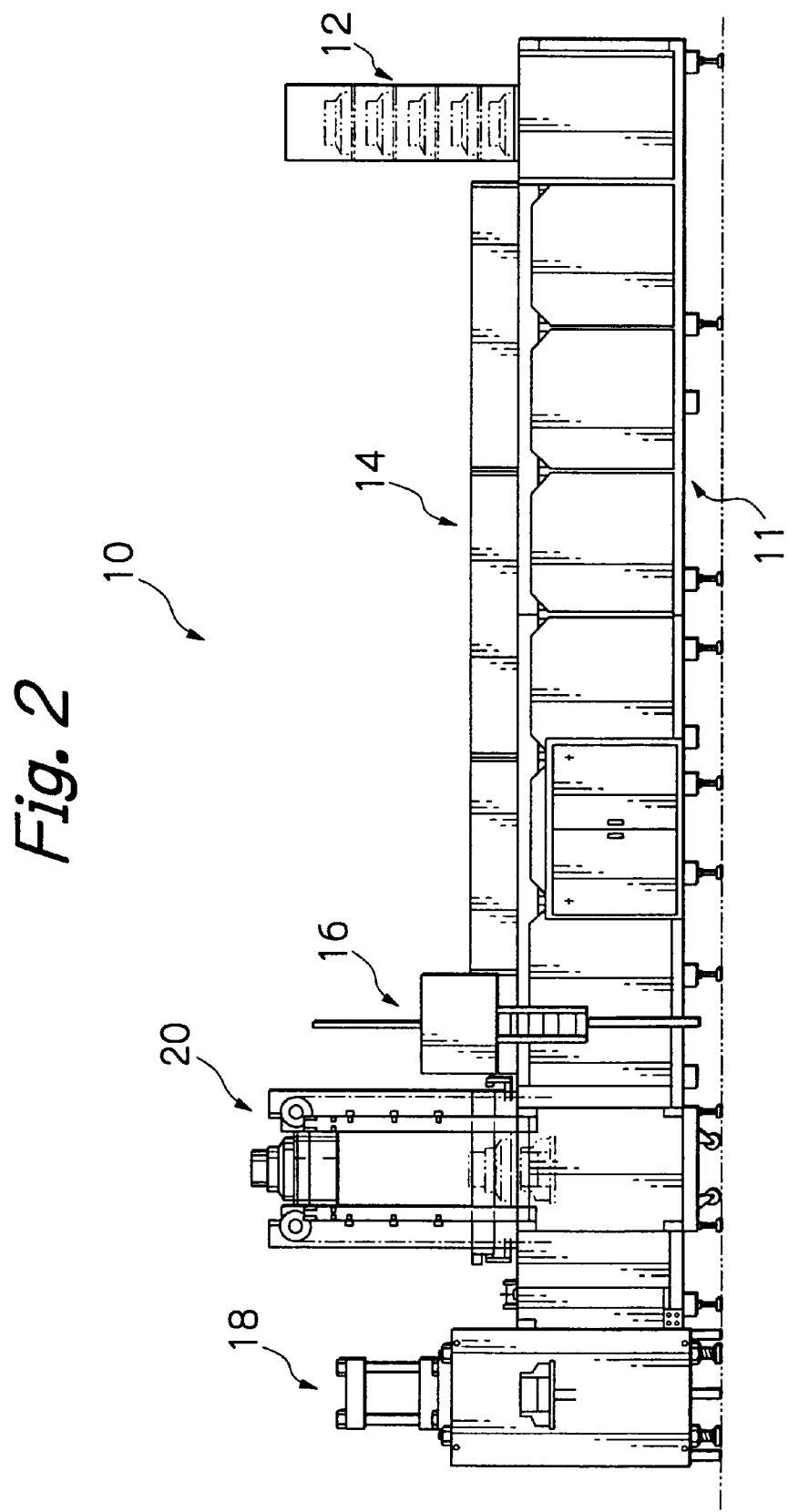
FIG. 2 is a side elevation view of an apparatus for automatically loading powder material into a mold, constructed and arranged in accordance with a first embodiment of the present invention.
Figure 3:
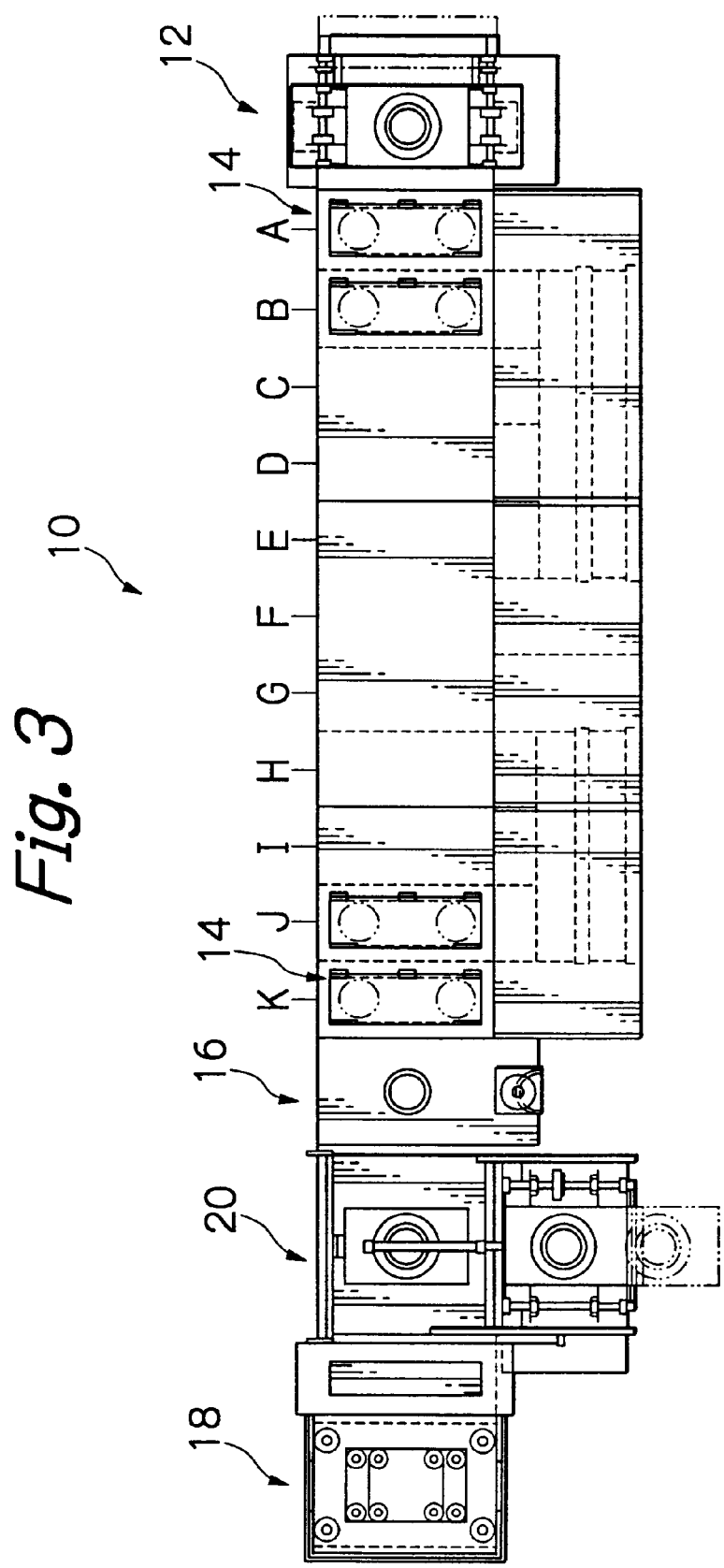
FIG. 3 is a plan view of the automatic powder material loading apparatus of FIG. 2.
Figure 4:
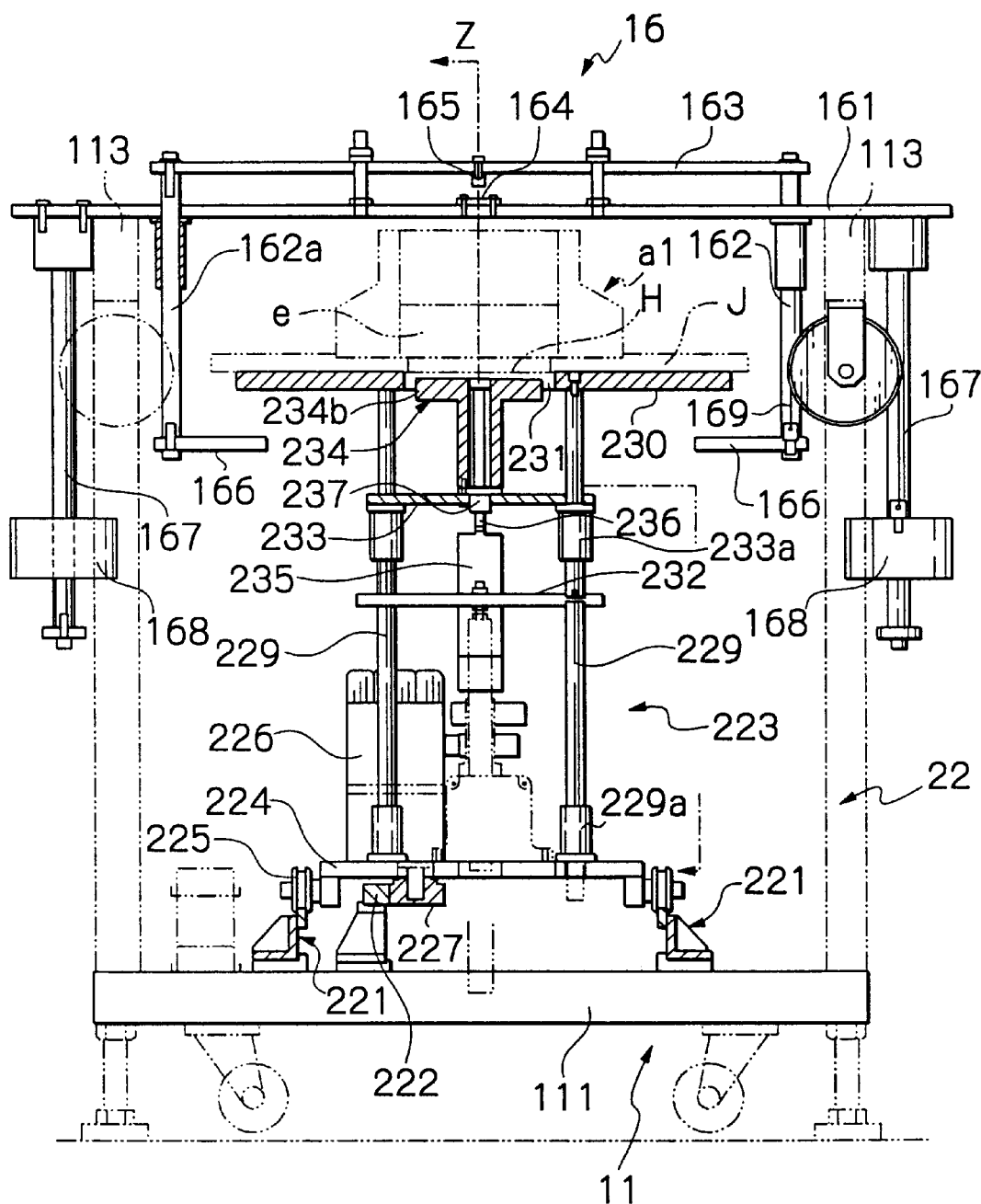
FIG. 4 is a front elevation view of a carrier and a measure unit of the automatic powder material loading apparatus of FIG. 2, showing the carrier partially cut away.

Referring next to FIGS. 2 to 15, we will describe an apparatus for automatically loading powder material into a sintering mold, constructed and arranged in accordance with a first embodiment of the present invention. FIGS. 2 and 3 show the whole of the automatic powder material loading apparatus 10 (referred to more simply as the "loading apparatus" hereinafter) of the first embodiment. The loading apparatus 10 may be suitably used to form in a sintering mold a multi-layered powder compact comprising layers of different powder materials, which differ from one another in at least one of properties including component(s) of powder material, percentages of components, particle size and particle shape. The loading apparatus 10 includes a plurality of powder filling mechanisms arranged in line and used independently for filling different powder materials, respectively, as detailed below. More specifically, the loading apparatus 10 comprises a frame 11 (shown extending in horizontal direction in FIGS. 2 and 3), a sintering mold dispenser unit 12 provided at one end (the right-hand end in FIGS. 2 and 3) of the frame 11, a powder filling system including a plurality of powder filling mechanisms 14 arranged in line along the length of the frame 11, a measure unit 16 provided on the frame 11 and located next to the powder filling system, a press unit 18 constructed separately from the frame 11 and located next to the left-hand end of the frame 11, a take-out unit 20 for taking our or picking up and sending a sintering mold, and a sintering mold conveyor system 22 (not shown in FIG. 2 nor FIG. 3) for conveying a sintering-mold-and-tray (i.e., a sintering mold together with a tray on which it is placed) from the sintering mold dispenser unit 12 to the press unit 18. Thus, in this embodiment, a sintering mold a1 is conveyed together with an associated tray J on which the sintering mold a1 is placed. As shown in FIG. 4 by imaginary lines, the tray J has a central, circular opening H formed therein, which has a smaller diameter than the bore b of the sintering mold. The tray J also has a central, shallow recess formed on its top surface, for receiving the bottom portion of the sintering mold so as to ensure appropriate placement of the sintering mold on the tray J during transportation. The sintering mold, when stored in the dispenser unit 12, has a lower press core e fitted in the bore b, with the outer peripheral edge of the bottom of the lower press core e being in engagement of the top surface of the tray J along the edge of the central opening H of the tray J. Under this condition, the sintering mold is dispensed by the dispenser unit 12 onto a carrier which is described in detail below.

With reference to FIGS. 4 and 5, the sintering mold conveyor system 22 includes a pair of spaced, horizontal guide rails 221 extending in the longitudinal direction of the elongated frame 11 to cover the entire length of the frame 11. The guide rails 221 are mounted on under frame members 111 of the frame 11 as well as on a base plate of the press unit 18. The conveyor system 22 further includes a rack 222 extending along the guide rails 221 and a carrier 223 supported by and movable along the guide rails 221. The carrier 223 includes a horizontal, flat, movable base plate 224 having four wheels 225 (two are provided on each of right- and left-hand sides (as viewed in FIG. 4) of the movable base plate 224, with only two of them being shown in FIG. 4). With these wheels 225 provided, the movable base plate 224 is capable of running along the guide rails 221. The movable base plate 224 is driven to run along the guide rails 221 by means of a drive motor 226 mounted on the movable base plate 224 and having reduction gears incorporated therein. The drive motor 226 has an output shaft with a pinion 227 fixedly mounted thereon and in engagement with the rack 222, so that operation of the drive motor 226 causes the movable base plate 224 to run along the guide rails 221. The movable base plate 224 has four bearing sleeves 229a fixedly mounted thereon (two are provided on each side of the base plate 224, with only two being shown in FIG. 4) and four vertical posts 229 supported and guided by the respective bearing sleeves 229a for vertical displacement relative to the movable base plate 224. A horizontal, flat, receiving plate 230 is secured to and supported by the upper ends of the four vertical posts 224. The receiving plate 230 has a central, circular opening 231 formed therein. When a tray J carrying a sintering mold a1 is placed on the receiving plate 230, the opening 231 is substantially in alignment with the hole b of the sintering mold a1. A mount plate 232 is secured to and interconnects the four vertical posts 229 near the middle points of the posts 229.

Figure 5A:
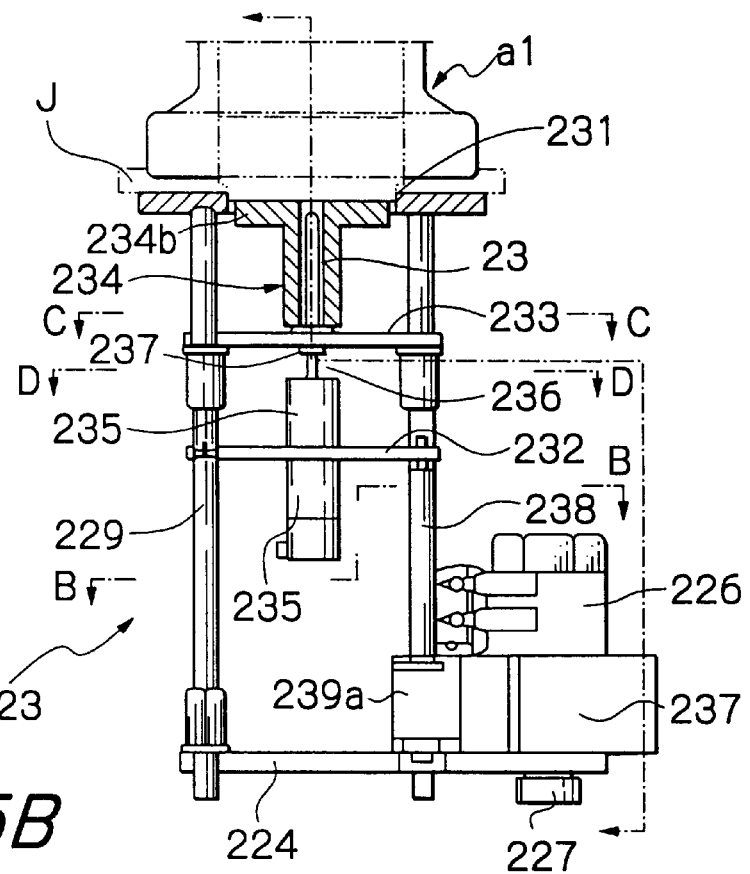
FIG. 5A is a side elevation view, partially sectioned, of the carrier as viewed in the direction of arrows Z—Z in FIG. 4.

A lift plate 233 is provided between the mount plate 232 and the receiving plate 230. The lift plate 233 has four bearing sleeves 233a fixedly mounted thereon, for receiving the respective vertical posts 229, such that the lift plate 233 is guided by the vertical posts 229 for vertical displacement. The lift plate 233 further has a push-up member 234 fixedly mounted on the top surface thereof, for pushing up the lower press core e fitted in the sintering mold a1 carried by the tray J on the receiving plate 230. The mount plate 232 has a drive motor 235 mounted thereon, which comprises an electric motor having reduction gears incorporated therein. The drive motor 235 has a vertical output shaft, the axis of which is in alignment with the axis of the opening 231 of the receiving plate 230. The output shaft of the drive motor 235 has a screw spindle 236 fixedly connected thereto, so that the operation of the drive motor 235 causes the screw spindle 236 to rotate. The lift plate 233 has a nut 237 fixedly mounted thereon and in thread engagement with the screw spindle 236. When the drive motor 235 is operated to rotate the screw spindle 236, the lift plate 233 is displaced together with the push-up member 234 in vertical direction relative to the vertical posts 229 and thus to the mount plate 232. The push-up member 234 has a cylindrical stem with its axis extending in vertical direction and a horizontal top flange 234b extending radially outwardly from the top end of the stem, with an axial bore 234a being formed therethrough to extend in vertical direction (FIG. 5A). The screw spindle 236 is received in the axial bore 234a of the push-up member 234. In the embodiment, the electric motor used in the drive motor 235 comprises a stepper motor capable of positioning control with accuracy allowing positioning errors which are well less than 0.1 mm and typically on the order of 0.01 mm. Other devices may be also used as long as they may provide compatible positioning accuracy.

The movable base plate 224 has a lift motor (an electric motor) 239 mounted thereon. A vertical rod 238 is fixedly connected to the mount plate 232, with the upper end of the rod 238 being secured to the mount plate 232. The movable base plate 224 further has a drive mechanism mounted thereon, for operatively interconnecting the output shaft of the lift motor 239 and the vertical rod 238 so as to translate rotary motion of the former into linear motion of the latter. The drive mechanism may comprise a rack-and-pinion mechanism, a feed screw mechanism or a roller mechanism comprising a roller in frictional contact with the vertical rod 238. Preferably, the drive mechanism may comprise a rotary nut (not shown) supported for rotation and driven by the lift motor 239, with the vertical rod 238 comprising a screw rod in thread engagement with the rotary nut. Such mechanism may typically allows the control of the vertical displacement of the mount plate 232 with accuracy allowing positioning errors less than 0.1 mm. In operation, when the lift motor 239 is operated to rotate the rotary nut, the mount plate 232 is displaced together with the posts 229 and the receiving plate 230 in a vertical direction relative to the movable base plate 224. The carrier 223 conveys a sintering mold a1, when the sintering mold a1 is placed on a tray, which is in turn placed on the receiving plate 230. The tray J is a plate-like member having a central, shallow recess formed in its top surface, for receiving the bottom of a sintering mold a1. The sintering mold a1 may be placed in position on the tray J as well as held by the tray J by virtue of the central recess. While the positioning and holding of a sintering mold on a tray is provided by the central recess of the tray in this embodiment, other known means may be also used to provide these functions. Further, while the sintering mold used in this embodiment comprises a hollow cylindrical body with a circular cross section, any other sintering molds comprising a tubular body with different cross sections may be also used. The movable base plate 224, the mount plate 232 and the lift plate 233 have recesses or cutouts 224', 232' and 233', respectively, which are open toward one direction, facing to one end of the guide rails 221, which direction is referred to as the forward direction of the carrier 233. The recesses 224', 232' and 233' are capable of receiving an upright, hollow cylindrical pedestal of the press unit 18 (providing the same function as the lower plunger g of FIGS. 1B to 1F, as described in greater detail below), such that the axis of the push-up member 234 may be substantially in alignment with the axis of the cylindrical pedestal. If the lower press core e is sized such that it may be fitted so tight in the sintering mold a1, the lower press core e will not be lowered within the mold during the subsequent powder filling operation without any support to the lower press core e. If this is the case, the drive motor 235 for lifting up/down the push-up member 234 relative to the mount plate 232 may be replaced by a hydraulic cylinder, as long as the latter is capable of defining the upper limit position of the lower press core e with precision.

Figure 7:
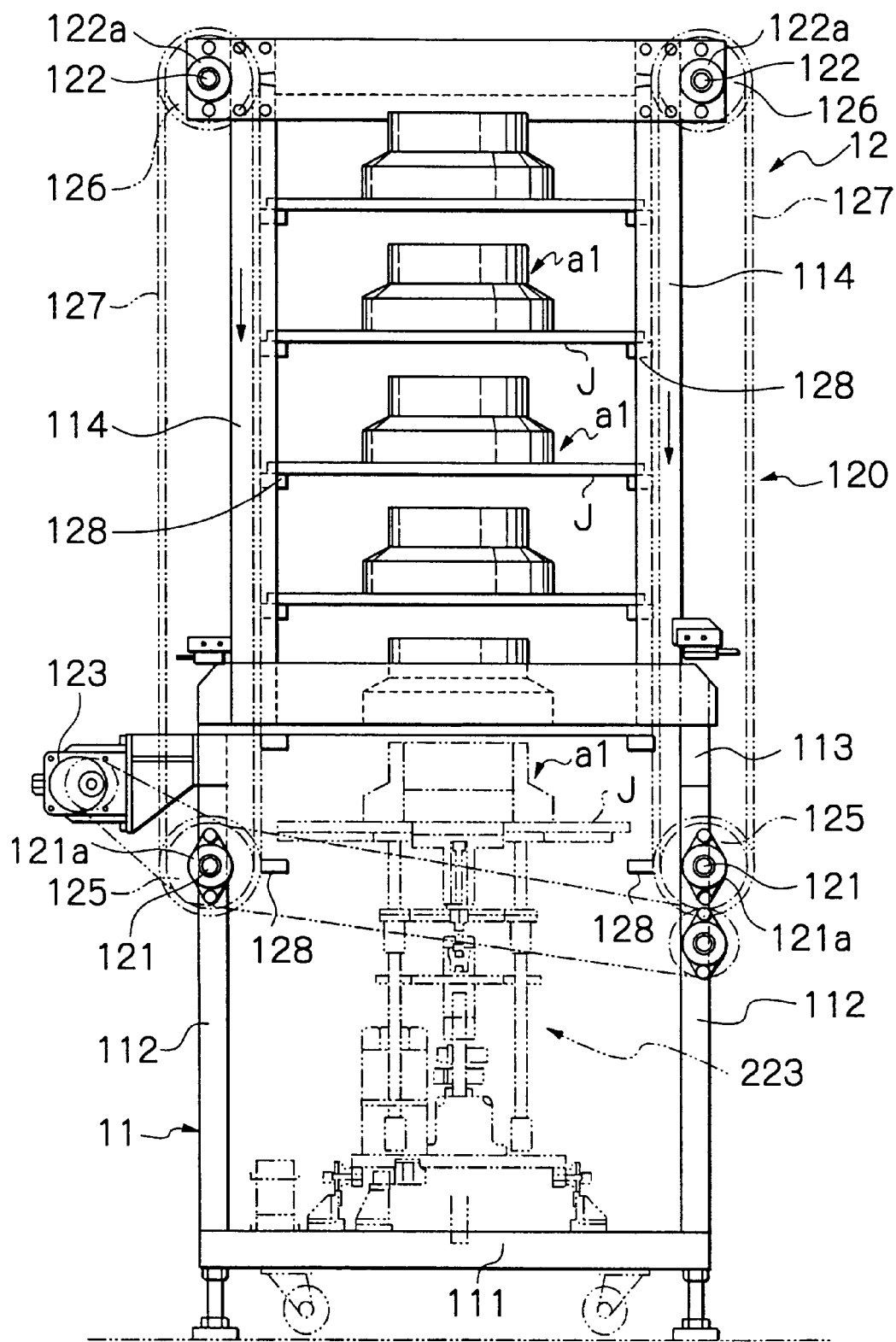
FIG. 7 is a front elevation view of a sintering mold dispenser unit.
Figure 8:
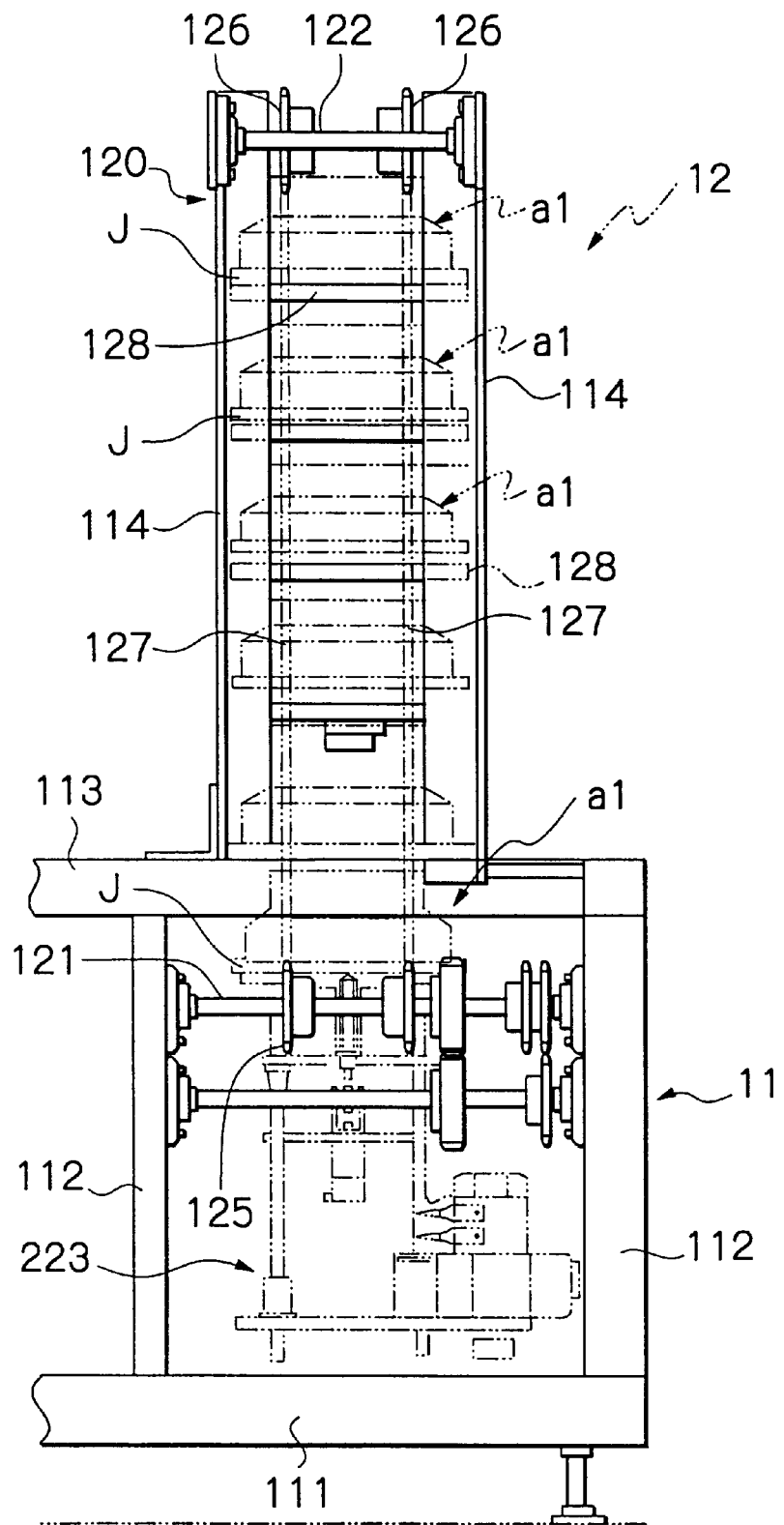
FIG. 8 is a side elevation view of the sintering mold dispenser unit of FIG. 7 as viewed in the direction square to the viewing direction of FIG. 7.

With reference to FIGS. 7 and 8, the sintering mold dispenser unit 12 comprises an elevator 120 for storing therein a plurality of sintering molds a1 together with associated trays J each carrying one of the molds a1, and for sequentially lifting down and dispense the sintering molds a1 with trays J. The elevator 120 comprises: a pair of horizontal drive shafts 121 provided on opposite sides of the frame 11 (right- and left-hand sides of the frame 11, as viewed in FIG. 7); a pair of horizontal idler shafts 122 associated with the drive shafts 121; and a drive motor (an electric motor) 123 for driving the drive shafts 121 to rotate. The drive shafts 121 are supported for rotation by means of respective bearings 121a of a known type and mounted thereby on the upper edges of a pair of right and left side members 112 of the frame 11 (FIG. 7). The frame, 11 further comprises two pairs of vertical columns 114 for the sintering mold dispenser unit 12, which are mounted on the pair of side members 112. The idler shafts 122 are supported for rotation by means of bearings of a known type and mounted thereby at the top ends of the vertical columns 114, such that the idler shafts 122 are provided on opposite sides of the frame 11 and just above the associated drive shafts 121. The sintering mold dispenser 12 further comprises a drive train of a known chain-and-sprocket type for transmitting the torque of the drive motor 123 and driving the drive shafts 121 to rotate in opposite directions (i.e., the right- and left-hand drive shafts are driven to rotate in clockwise and counterclockwise directions, respectively, as viewed in FIG. 7). More specifically, the drive train comprises, for each side of the frame 11, a pair of spaced sprockets 125 fixedly mounted on the drive shaft 121 on that side of the frame 11 and a pair of spaced sprockets 126 fixedly mounted on the idler shaft 122 on that side, the sprockets 126 being spaced apart the same distance as the sprockets 125. For each side of the frame 11, the pair of sprockets 125 on the drive shaft 121 and the pair of sprockets 126 on the idler shaft 122 are operatively connected through a pair of endless chains 127 wound round them. In this manner, two pairs of chains 127 are provided in total, one pair being provided on each side of the frame 11. Each pair of chains 127 have a plurality of horizontal, support bars 128 mounted thereon at constant intervals and interconnecting the chains 127 of the pair. The pair of drive shafts 121 are driven to rotate in opposite directions and in synchronism, and the phase between the left- and right-hand chain pairs (as viewed in FIG. 7) is adjusted such that the support bars 128 provided on the left-hand chain pair are always kept to be level with their corresponding support bars 128 provided on the right-hand chain pair.

One of the support bars 128 provided on the left-hand chain pair (as viewed in FIG. 7) and the corresponding support bar 128 provided on the right-hand chain pair together form a support bar pair. Each pair of support bars 128 supports a tray J carrying a sintering mold a1, so that a plurality of sintering molds a1 may be stored in the sintering mold dispenser unit 12. For dispensing a sintering mold a1, the drive motor 123 is operated to move the chains 127 a predetermined distance at a time, and in directions as indicated by respective arrows in FIG. 7, so that the trays supported by the support bar pairs are lifted down and the lowest of the trays is dispensed onto the receiving plate 230 of the carrier 223, which is then located under the sintering mold dispenser unit 12.

Figure 9:
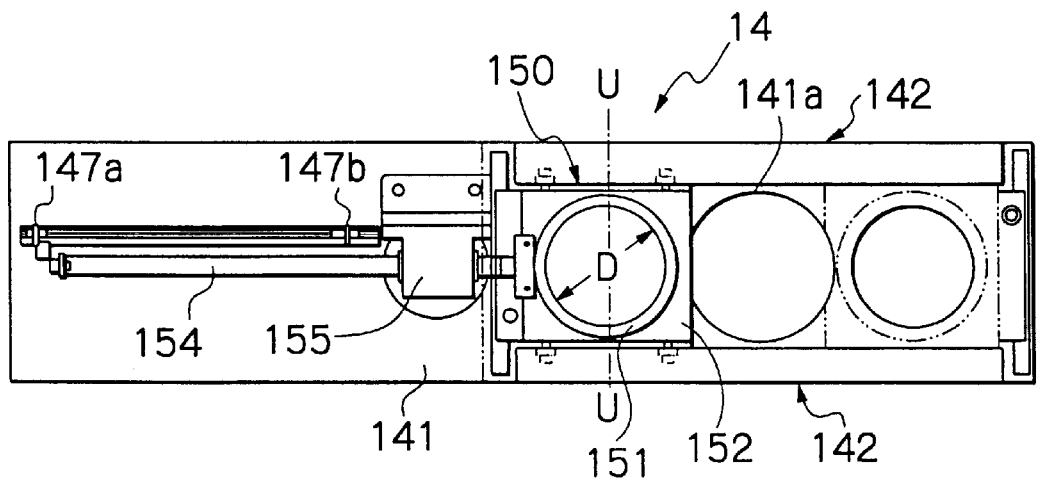
FIG. 9 is a plan view of a powder filling mechanism.
Figure 10:
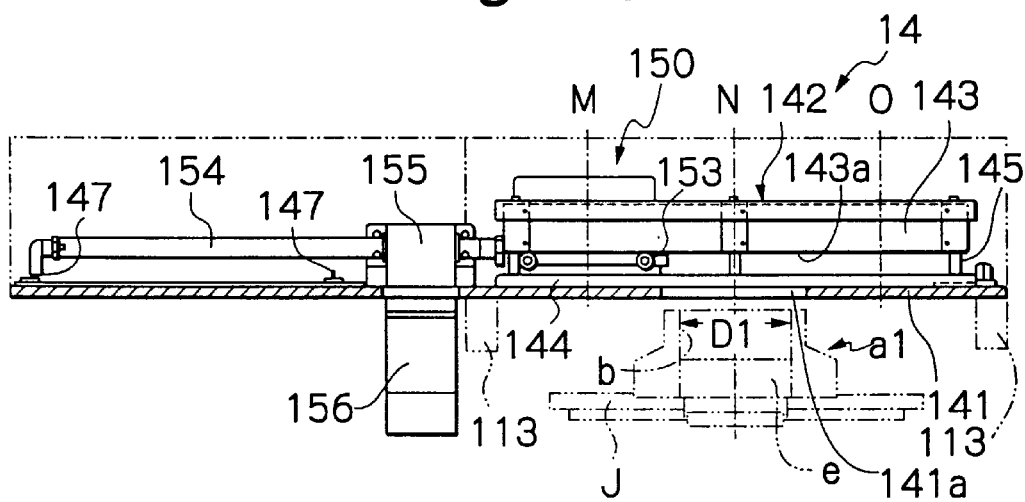
FIG. 10 is a longitudinal section view of the powder filling mechanism of FIG. 9.
Figure 11:
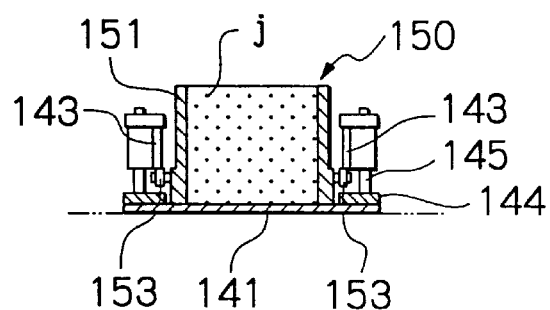
FIG. 11 is a cross section view of the powder filling mechanism of FIG. 9 taken along line U—U of FIG. 9.

The powder filling mechanisms 14 are arranged in line along the transportation path of the carrier 223. The number of the units 14 should be equal or greater than the number of different powder materials to be used. Since the powder filling mechanisms 14 have the same construction and are used to provide identical functions, only one of them is described in detail. With reference to FIGS. 9, 10 and 11, the frame 11 includes a pair of upper beams 113 (FIG. 10) extending in the longitudinal direction of the frame 11, i.e., parallel to the guide rails 221. As shown, the powder filling mechanism 14 comprises a generally rectangular, support plate 141 horizontally fixed on the upper beams 113 of the frame 11 in a known manner. The support plate 141 extends perpendicular to the running direction of the carrier 233 and over the transportation path of the sintering mold a1 conveyed by the carrier 223. The powder filling mechanism 14 further comprises a pair of horizontal, hopper guide rails 142 mounted on the top surface of the support plate 141 and spaced apart in the running direction of the carrier 223 and a movable hopper 150 provided on the support plate 141 and between the hopper guide rails 142. The hopper guide rails 142 extend perpendicular to the running direction of the carrier 223 and over the transportation path of the sintering mold a1. The movable hopper 150 is supported and guided by the hopper guide rails 142 for horizontal displacement. The support plate 141 has an opening 141a (of a circular shape in the embodiment) formed therein. The opening 141a is formed at such position that a sintering mold placed on the carrier 223 may be in alignment therewith, when the carrier 233 has been brought to the powder filling position of the powder filling mechanism 14. Further, the opening 141a is so sized as to be capable of receiving the top end of the sintering mold without any substantial clearance therebetween. Each of the hopper guide rails 142 includes: a guide plate 143 defining a horizontal guide surface 143a facing downward; a base plate 144 secured to the support plate 141 in a known manner; and a plurality of support rods 145 interconnecting the guide plate 143 and the base plate 144 with a space left therebetween.

The movable hopper 150 comprises a hollow cylindrical body 151 having an inner diameter substantially equal to or somewhat greater than that of the bore $\underline{b}$ of the sintering mold a1 and having a bottom flange 151 extending radially outwardly. The bottom flange 151 has a rectangular outer contour as seen in plan, which is nearly square having four sides, of which a pair of opposite sides extend along the hopper guide rails 143. Two rollers 153 are provided on each of these sides of the bottom flange 151, for rolling on the guide surface 143a of the corresponding one of hopper guide rails 143. The rollers 153 (four, in total) are always in engagement with the guide surfaces 143a, which faces downward as described above, so that the movable hopper 150 is effectively prevented thereby from rising apart from the top surface of the support plate 141. The body 151 of the movable hopper 150 is filled with a powder material. While it is generally preferable that the inner cavity of the hopper body 151 has a cross section corresponding to that of the sintering mold into which the powder material is to be filled from the movable hopper 150, other cross sections may be also used to achieve acceptable results. For example, for a sintering mold having a hollow cylindrical body with a circular cross section, we may use a hopper having a tubular body with a square cross section. Further, the cross section of the inner cavity of the hopper body 151 may preferably have a size which is either equal to or somewhat greater than that of the cross section of the bore of the sintering mold to be used. Thus, if both of their cross sections are circular, the preferable relationship may be expressed as D1<D2, where D1 and D2 stand for the inner diameters of the bore of the sintering mold and the inner cavity of the hopper body, respectively.

The movable hopper 150 has a rod 154 having one end connected to the movable hopper 150 on one side (the left-hand side as viewed in FIGS. 9 and 10) of the movable hopper 150 and extending parallel to the hopper guide rails 142 (i.e., in the horizontal direction as viewed in FIGS. 9 and 10). The rod 154 is supported by a linear bearing 155 for sliding movement along the longitudinal direction of the rod 154, with the linear bearing 155 being fixedly mounted on the support plate 141. The rod 154 is driven for reciprocal linear motion by means of a drive motor 146 and a suitable drive mechanism of a known type (not shown). The drive mechanism may be a rack-and-pinion drive comprising rack-teeth formed on the rod 154 and a pinion in engagement with the rack-teeth and driven by the drive motor 146 for rotation in both directions. Such a drive mechanism may be preferably housed within the casing of the linear bearing 155. The position of the rod 154 and thus the position of the movable hopper 150 is detected by a pair of position sensors 147a and 147b, which are mounted on the support plate 141 at positions spaced apart in the moving direction of the rod 154.

The powder filling mechanism 14, having the arrangement as described above, operates as follows. When ready for operation, the movable hopper 150 has a sufficient amount of powder material j stored in the cavity of the body 151 and is positioned at one of two waiting positions M and O shown in FIG. 10. The carrier 223, which has a sintering mold a1 and an associated tray J placed thereon, is driven to bring the sintering mold a1 to the powder filling position of the powder filling mechanism 14. Then, the lift motor 239 on the carrier 223 is operated to lift up the assembly composed of the receiving plate 230 and the four vertical posts 229, until the top end of the sintering mold a1 on the tray J enters in the opening 141a of the support plate 141 and the top surface $\underline{c}$ of the sintering mold a1 becomes substantially level with (or flush with) the top surface of the support plate 141. Simultaneously, the drive motor 235 on the carrier 223 is operated to rotate the screw spindle 236 to lift up the lift plate 233 together with the push-up member 234 relative to the receiving plate 130 and thereby to displace the lower press core $\underline{e}$ upward relative to the sintering mold a1, until the top surface of the lower press core $\underline{e}$ is raised to reach the level with which the distance (or depth) of the top surface of the lower press core $\underline{e}$ from the top surface $\underline{c}$ of the sintering mold a1 becomes a desired distance (or desired depth). In order to prevent rise of the sintering mold when the lower press core is displaced upward in the sintering mold, the powder filling mechanism 14 is provided with a clamp (not shown) for gripping the sintering mold to secure it to the powder filling mechanism 14. The "desired" depth of the top surface of the lower press core from the top surface of the sintering mold a1 depends on the desired amount of powder material to be filled into the sintering mold or the desired thickness of the powder layer to be formed in the sintering mold. On the other hand, the "actual" depth of the top surface of the lower press core from the top surface of the sintering mold a1 may be controlled base on the measurement of the vertical position of the push-up member 234 relative to the vertical position of the receiving plate 230, with knowledge of the height of the sintering mold a1 and the height (or thickness) of the lower press core. Then, the movable hopper 150 is operated to make a stroke of movement from the position M to the position O or vice versa. During this stroke, the bottom opening (or mouth) of the inner chamber of the movable hopper 150 passes through the top opening (or mouth) of the bore $\underline{b}$ of the sintering mold a1, then an amount of powder is filled into the bore $\underline{b}$ of the sintering mold a1 from the movable hopper 150. When the movable hopper 150 reaches either of the positions M and O, the powder filling operation is completed. Because the bottom surface of the movable hopper 150 is kept in contact against the top surface of the support plate 141 during its stroke, the amount of powder material just filled into the sintering mold a1 has a flat top surface which is level with the top surface of the sintering mold a1. Thus, the edge of the bottom surface of the movable hopper 150 serves as a strickle for strickling off any excessive amount of powder material to the level of the top surface of the sintering mold a1. After completion of the powder filling operation, the receiving plate 130 of the carrier 223 is lowered together with the sintering mold. The lower press core is fitted tight into the bore of the sintering mold so that a significant force is needed for causing displacement of the lower press core relative to the sintering mold, with the result that any unintended lowering of the lower press core relative to the sintering mold will never be caused by gravity. Thus, in the case where a hydraulic cylinder is used in place of the lift motor 235 for lifting up/down the push-up member 234, once the push-up member 234 is raised to set the lower press core to a desired position for the powder filling operation for the first powder layer in the sintering mold, it is no longer necessary to retain the push-up member 234 at that position but the push-up member 234 may be lowered.

With reference again to FIGS. 4 and 6, the measure unit 16 comprises: a horizontal support plate 161, which is fixedly mounted on the upper beams 113 of the frame 11 and extends over the transportation path of the carrier 223; four bearing sleeves 162a fixedly mounted on the support plate 161; and four vertical rods 162 supported by the respective bearing sleeves 162a for vertical displacement. The four bearing sleeves 162a are provided on the support plate 161, with two of them being located at each end (each of the right- and left-hand ends as viewed in FIG. 4) of the support plate 161. The measure unit 16 further comprises: a connecting plate 163 secured to the upper ends of the vertical rods 162; a load sensor 164 secured to the support plate 161 at the middle point of the support plate 161; and a pusher 165 fixedly attached to the connecting plate 163 for pushing down the top end of the load sensor 164. Each of the vertical rods 162 has a support bar 166, which is connected at the lower end of the associated vertical rods 162 and extends horizontally toward the transportation path of the carrier 223. Vertical guide rods 167 for guiding counterweights 168 in vertical direction are fixedly connected to the support plate 161. A support bar 166 extending toward the carrier is fixed to the lower end of each of the vertical rods. The support bars 166 are connected to the counterweights 168 through cables 169, such that the total weight of the vertical rods 162, the connecting plate 163, the sintering mold and the tray is substantially balanced with the counterweights 168, in order to prevent any excessive load from acting on the lord sensor 164. In operation, a sintering mold may be brought to the measuring position of the measure unit 16 each time the powder filling operation has been effected to the sintering mold. Alternatively, a sintering mold may be brought to the measuring position only when the powder filling operations for all the powder layers to be formed in the sintering mold have been done. In either case, when the sintering mold is brought to the measuring position by the carrier 233, the lift motor 239 in the carrier 223 is operated to lift down the receiving plate 130. When the receiving plate 130 is lifted down below the support bars 166, the sintering-mold-and-tray placed on the receiving plate 223 is passed to the support bars 166. The sintering-mold-and-tray is now supported solely by the support bars 166, and the total weight of the amounts of powder materials having been filled into the sintering mold so far is measured by the load sensor 164, which excludes the weights of the vertical rods 162, the connecting plate 163, the tray J, the sintering mold a1 and the lower press core $\underline{e}$. Further, from the measurements thus obtained, the weight of the amount of powder material last filled into the sintering mold can be determined. The measurement operation may be performed either before or after the pressing operation which is described in detail below.

Figure 5B:
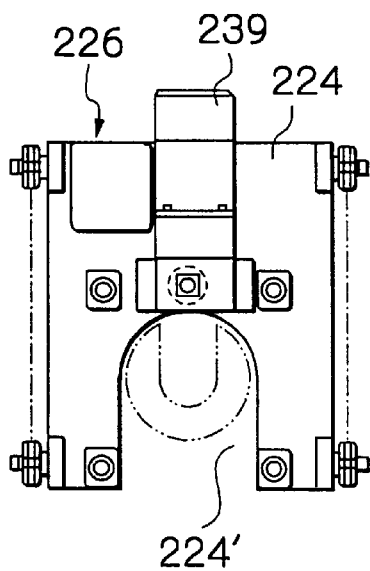
FIG. 5B is a section view of the carrier as viewed in the direction indicated by arrows B—B in FIG. 5A.
Figure 5C:
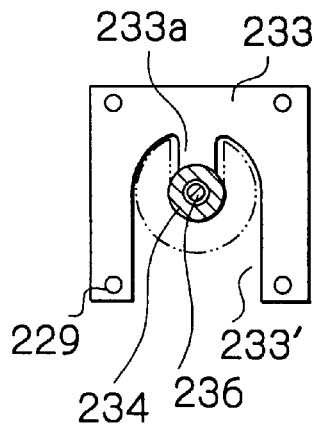
FIG. 5C is a section view of the carrier as viewed in the direction indicated by arrows C—C in FIG. 5A.
Figure 5D:
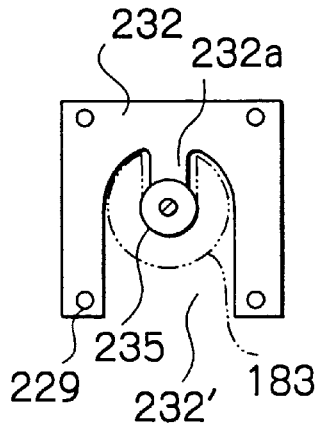
FIG. 5D is a section view of the carrier as viewed in the direction indicated by arrows D—D in FIG. 5A.
Figure 6:
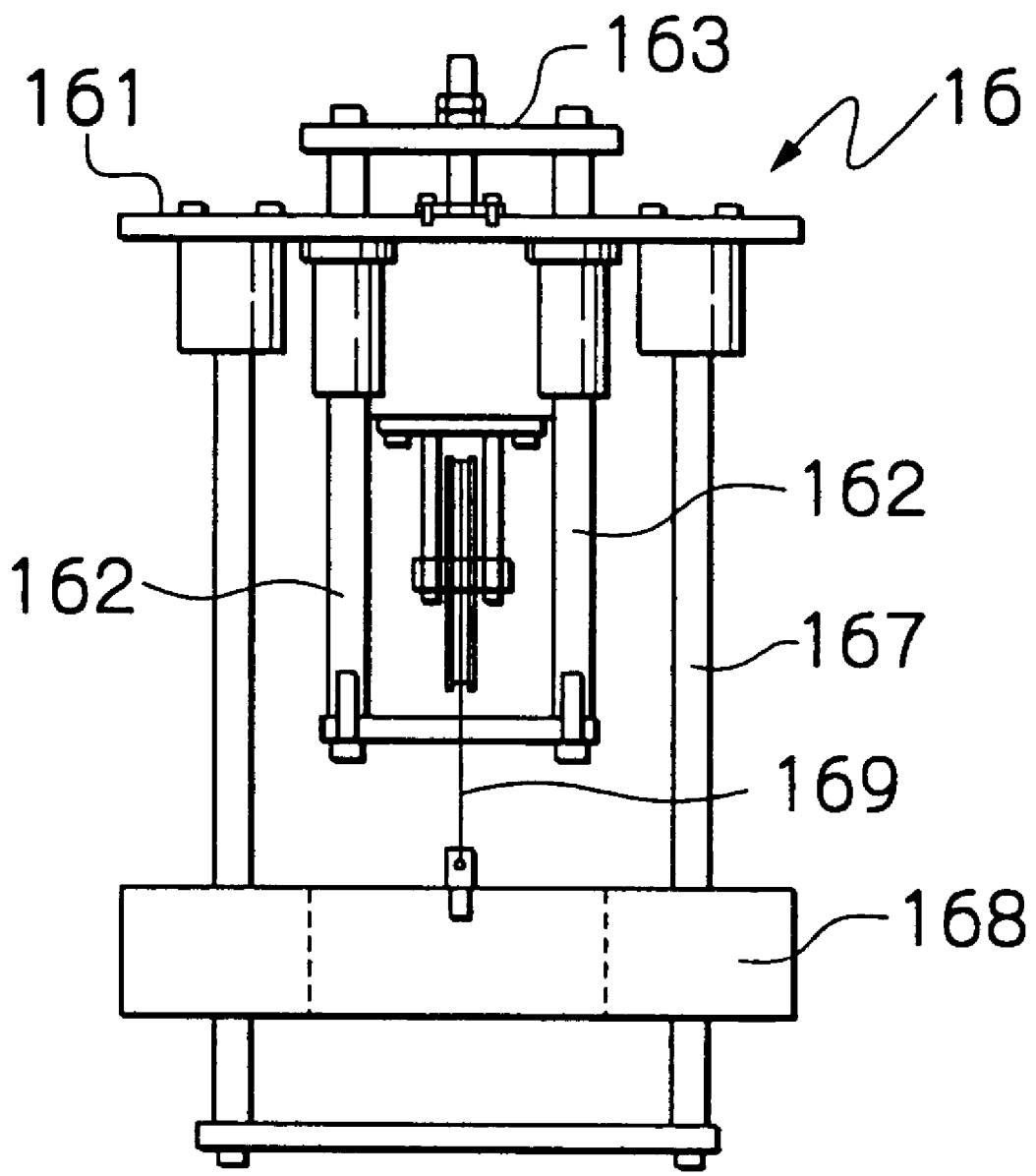
FIG. 6 is a side elevation view of the measure unit of FIG. 4 as viewed in the direction square to the viewing direction of FIG. 4.
Figure 12:
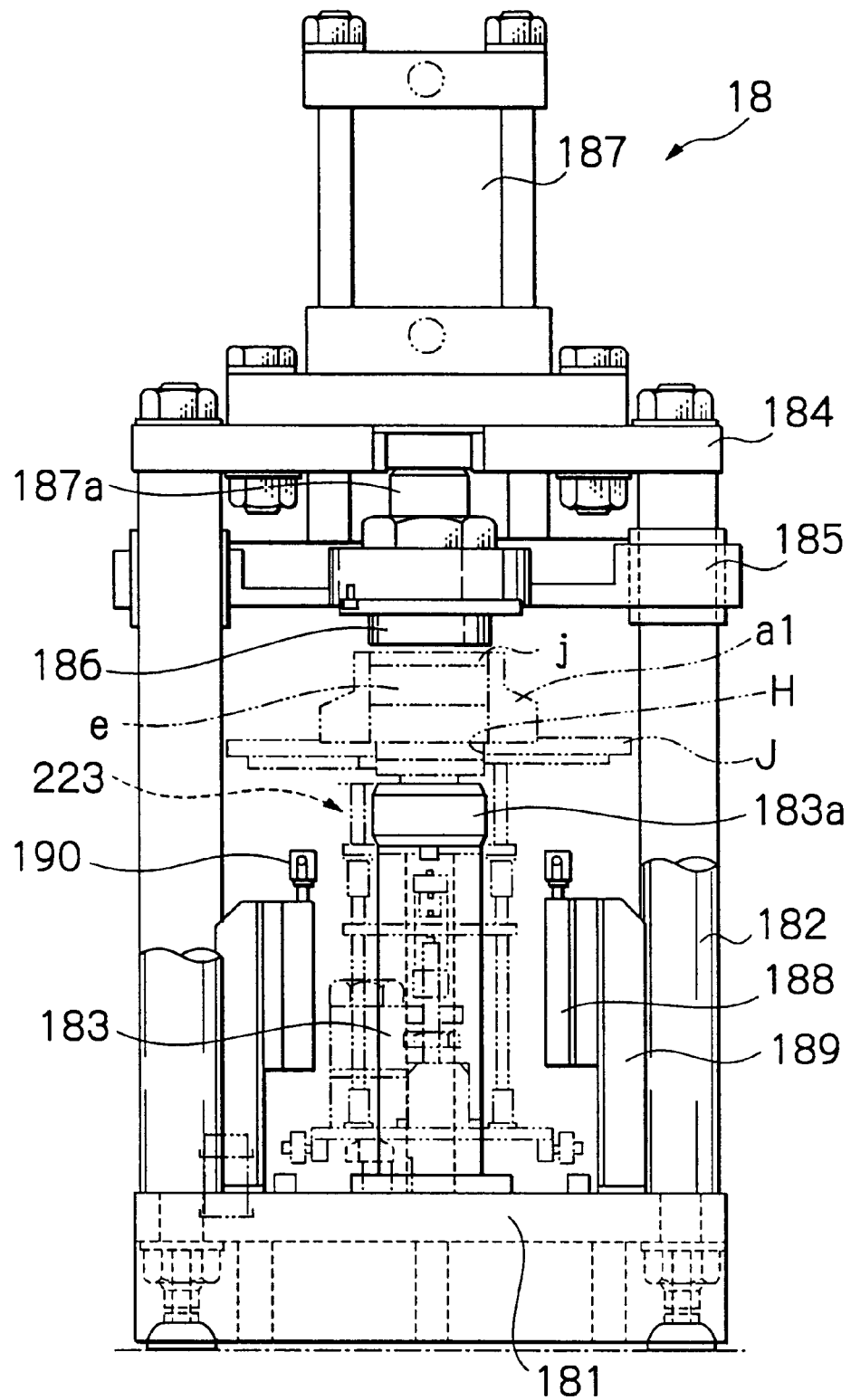
FIG. 12 is a front elevation view of a press unit.
Figures 13A, 13B:
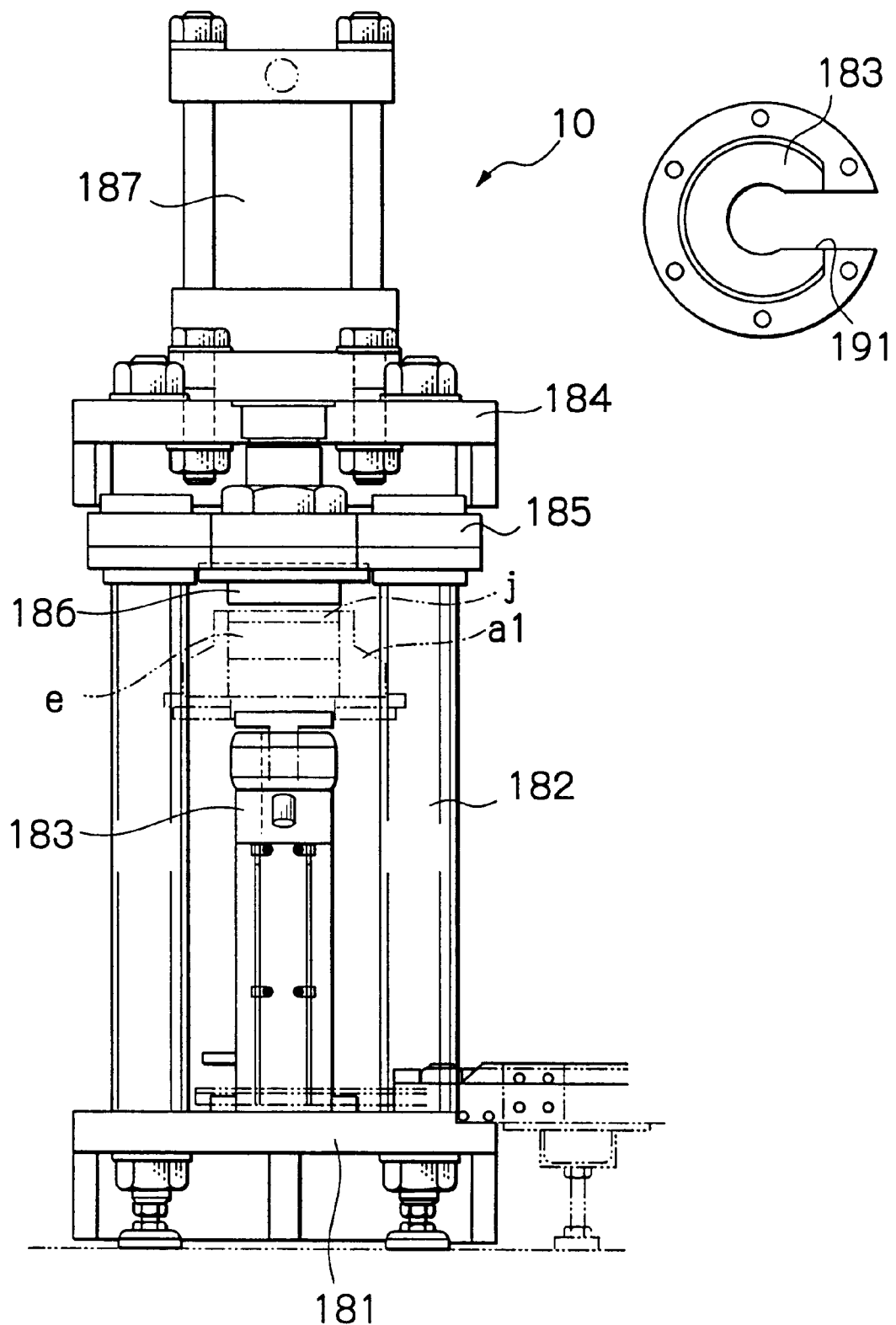
FIG. 13A is a side elevation view of the press unit of FIG. 12 as viewed in the direction square to the viewing direction of FIG. 12.
FIG. 13B is a enlarged plan view of the pedestal of the press unit of FIG. 12.

With reference to FIGS. 12 and 13, the press unit 18 comprises a rectangular base plate 181 which is separate from the frame 11; four upright columns 182 fixedly mounted on the base plate 181, one at each corner of the base plate 181; an upright pedestal 183 fixedly mounted on the base plate 181 at the center thereof; a top plate 184 supported by and connected to the upper ends of the columns 182; a press guide 185 guided by the columns 182 for vertical movement between the top plate 184 and the base late 181; an upper plunger or press member 186 fixedly mounted on the press guide 185; an hydraulic cylinder 187 secured to the top plate and having a piston rod 187a connected to the press guide 185. The base plate 181 is provided with a pair of guide rails (not shown) mounted thereon, the guide rails forming an elongation of the guide rails 221 mounted on the under frame members 111 of the frame 11, so that the carrier 233 may be operated to run not only along the guide rails 21 on the frame 11 but also along the guide rails on the base plate 181. The pedestal 183 has a top end 183a which is so shaped and sized as to be received in the opening 131 of the receiving plate 130 of the carrier 223 as well as in the opening H formed in the tray J. The pedestal 183 is of a hollow cylindrical shape and has a cutout 191 formed therein, as shown in FIG. 12B. The cutout 191 faces the direction from which the carrier approaches the pedestal 183 and forming a through path between the inside and the outside of the hollow cylindrical pedestal 183. When the carrier 223 has reached the pressing position of the press unit 16, the cutout 191 allows a part of the carrier 233 to enter the inside space of the pedestal 183, which part includes the cylindrical stem portion of the push-up member 234, the drive motor 235, the central portion 232a of the mount plate 232 and the central portion 233a of the lift plate 233 (see FIGS. 5C and 5D). Further, when the carrier 223 is in this position, the top flange 234b of the push-up member 234 extends above the top, circular edge of the pedestal 183, with the axis of the push-up member 234 and being substantially in alignment with the axis of the pedestal 183. In addition, when the carrier 223 is in this position, the pedestal 183 is received in the recess or cutout 224' formed in the lift plate 224 of the carrier 223 (FIGS. 5B and 5D). The upper plunger or press member 186 has a lower end so shaped and sized as to be fitted tight in the bore $\underline{b}$ of the sintering mold a1. The press unit 18 further comprises a pair of hydraulic cylinders (lift cylinders) 188 mounted on the base plate 181 through respective brackets 189 at positions on opposite sides of the pedestal 183. The hydraulic cylinders 188 are supported by the corresponding brackets 189 with their piston rods 188a extending upward. A pair of support members 190 are attached to the upper ends of the piston rods 188a, respectively.

In operation, when the press unit 18 is in a condition to wait for a sintering mold to arrive, the press guide 185 having the upper plunger 186 mounted thereon is placed at its upper position by means of the hydraulic cylinder 187, while the lift cylinders 188 are controlled such that their piston rods 188a are in their retreated position. When the carrier 223 arrives at the pressing position of the press unit 18, the pedestal 183 is received in the recesses 224', 232' and 233' of the lift plate 224, the mount plate 232 and the lift plate 233, respectively, while the cylindrical stem portion of the push-up member 234, the drive motor 235, the central portion 232a of the mount plate 232 and the central portion 233a of the lift plate 233 together enter the inside space of the pedestal 183 through the cutout 191. When the carrier 221 has reached the pressing position, the axis of the push-up member 234 is substantially in alignment with the axis of the pedestal 183 and the top flange 234b of the push-up member 234 extends above the top edge of the pedestal 183. Then, the lift motor 239 is operated to lower the receiving plate 230 of the carrier 223 and thus lower the tray J on which a sintering mold a1 is placed, until the under surface of the top flange 234b of the push-up member 234 come into engagement with the top edge of the pedestal 183, when the top surface of the top flange 234b remains in contact with the bottom surface of the lower press core e fitted in the sintering mold, so that the sintering mold a1 is thereby supported with the lower press core e fitted therein and the amount of powder material filled therein. Then, the hydraulic cylinder 187 is operated to lower the press guide 185 and the upper plunger or press member 186 along the columns 182, so that the powder material filled into the sintering mold is pressed by the upper plunger 186 at a desired pressure and for a desired length of time.

When the pressing operation has been done, the powder material in the sintering mold has been more or less compacted, so that the top surface of the resultant powder compact has been sunk from the initial level, i.e., the level of the top surface c of the sintering mold. This sinkage can be measured by detecting the relative vertical displacement of the bottom surface of the upper plunger 186 with respect to the top surface of the sintering mold. The detection may be achieved by using a suitable sensor, such as a touch sensor. The sinkage produced by the pressing operation is much less than the thickness of any powder layer which may be possibly formed next in the sintering w mold. Therefore, if another powder layer is to be formed on the layer of the powder compact, the powder compact has to be displaced downward relative to the sintering mold in order to allow for the powder filling operation for the next powder layer (the sinkage produced by compaction of the powder compact plus the subsequent downward displacement of the powder compact relative to the sintering mold will be equal to the thickness of the next powder layer). Thus, with the lower press core and the powder compact being kept pressed between the pedestal 183 and the upper plunger 186, the lift cylinders 188 are operated to extrude their piston rods 188a upward, with the result that the support members 190 attached to the upper ends of the piston rods 188a come into engagement with the receiving plate 230 of the carrier 223 so as to lift up the receiving plate 230. Simultaneously, the hydraulic cylinder 187 is operated to lift up the upper plunger 186 at the same rate as the receiving plate 230, so that the powder compact is kept pressed. Further, at the same time, the lift motor 239 is operated in direction to lift up the receiving plate 230 (the push-up member 234 is lifted up together with the receiving plate 230). The operations above continue until the receiving plate 230 of the carrier 233 is lifted up to reach the level at which the receiving plate 230 is maintained during conveyance of a sintering mold. When the level is reached, the upper plunger 186 and the push-up member 234 are now displaced downward relative to the sintering mold, with the powder compact being kept pressed therebetween, until the amount of the downward displacement of the push-up member 234 reaches the desired amount (which depends on the selected amount of powder material to be filled for the next powder layer). In this manner, the powder compact is displaced downward relative to the sintering mold a1. The amount of the downward displacement of the powder compact can be detected by measuring the displacement of the push-up member 234. In the case where the powder compact to be formed is a non-multi-layered powder compact so that only a single powder layer needs to be formed in the sintering mold (such a powder layer usually has a greater thickness than any powder layer in a multi-layered powder compact), the amount of the upward displacement of the tray and the sintering mold thereon is controlled such that the vertical position of the powder compact relative to the sintering mold will be the most suitable position for the sintering operation subsequently performed. In order to perform another powder filling operation for the next powder layer following the powder filling and pressing operations for the previous powder layer, the push-up member 234 is displaced downward relative to the receiving plate 230 by the distance corresponding to the thickness of the next powder layer. (However, the push-up member 234 may be further lowered to the waiting position if the under press core need not be supported during the next powder filling operation). Also, in the case where the powder compact to be formed is a multi-layered powder compact so that a plurality of powder layers need to be formed in the sintering mold, following the powder filling and pressing operations for the last powder layer, the amount of the upward displacement of the tray and the sintering mold thereon is controlled such that the vertical position of the powder compact relative to the sintering mold will be the most suitable position for the sintering operation subsequently performed. It is noted that the fit of the upper plunger 186 in the bore of the sintering mold is a tight fit (in order to prevent escape of any powder which could otherwise occur through a clearance between the bore and the upper plunger 187), the upper plunger 186 tends to drag upward the sintering mold when lifted up for removal from the sintering mold. In order to prevent the drag of the sintering mold by the upper plunger 186, a clamping mechanism (not shown) is provided on the press unit 18 for clamping the sintering mold when the upper plunger 186 is lifted up for removal from the sintering mold.

Figure 14:
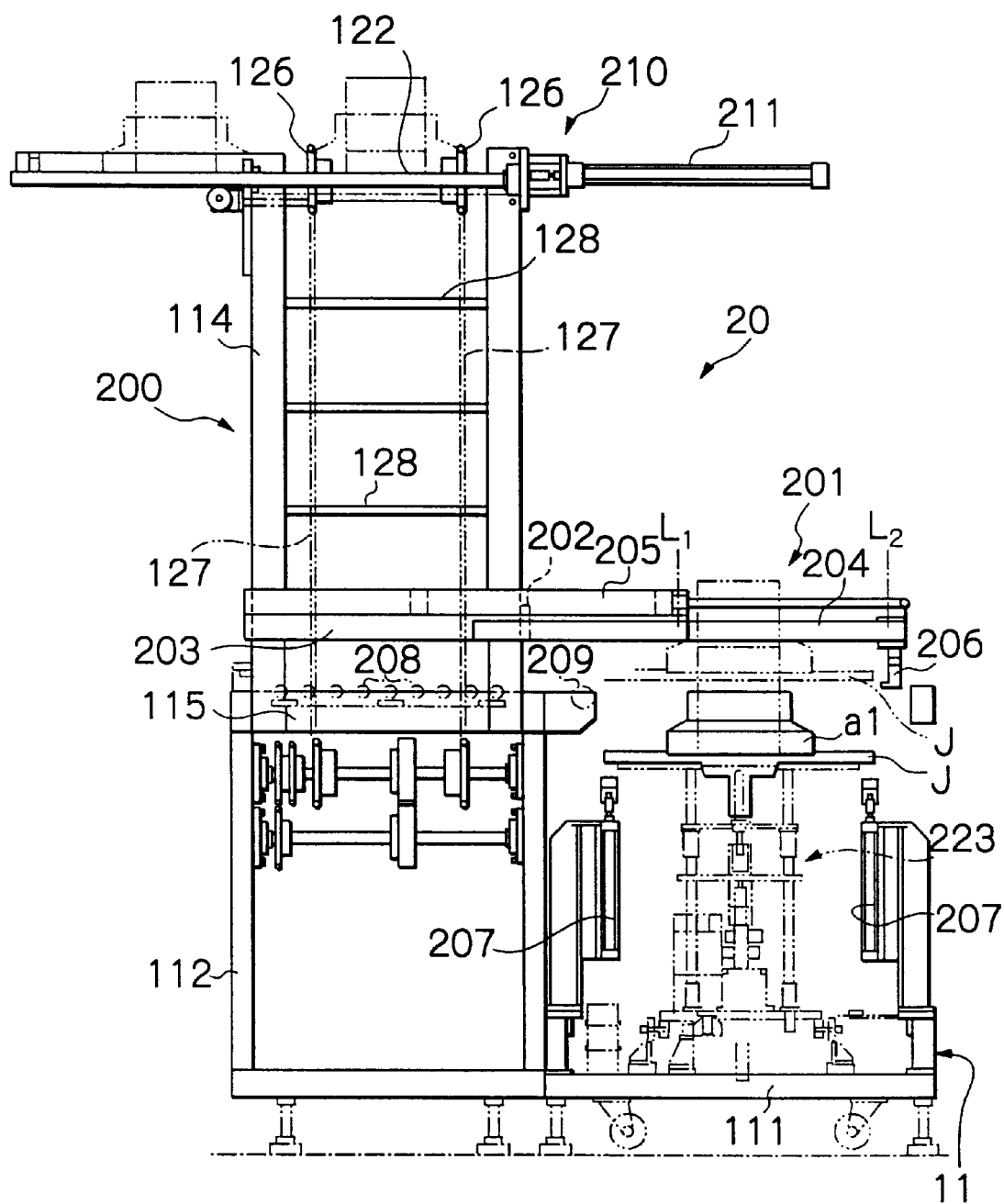
FIG. 14 is a side elevation view of a sender unit.
Figure 15:
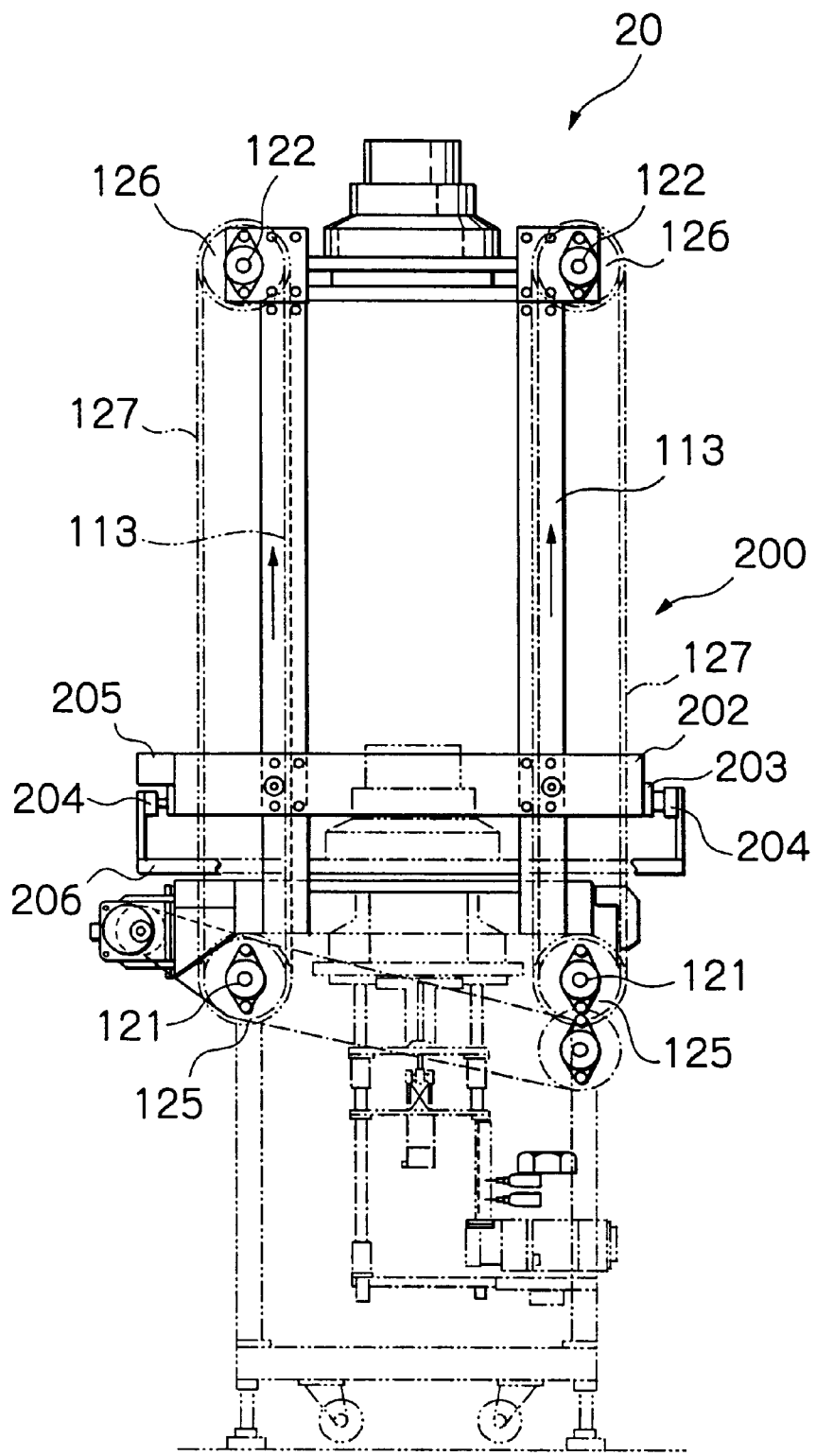
FIG. 15 is a front elevation view of the sender unit of FIG. 14 as viewed in the direction square to the viewing direction of FIG. 14.

With reference to FIGS. 14 and 15, the take-out unit 20 serves to sequentially pick up from the carrier 223 trays with sintering molds having been subjected to the pressing operation in the press unit 18 and send them to the next process station. The sender unit 20 comprises an elevator 200 having a construction similar to the elevator 120 of the sintering mold dispenser unit 12; therefore, like parts and elements are designated by like reference numerals and not described in detail for simplicity. A primary difference between the elevator 200 of the take-out unit 20 and the elevator 120 of the sintering mold dispenser unit 12 resides in that the latter serves to sequentially lift down trays with sintering molds placed thereon (i.e., sintering-mold-and-trays) and dispense them onto the carrier 233, while the former serves to sequentially pick up or take out sintering-mold-and-trays from the carrier 223 and lift up them to a conveyor line. The take-out unit 20 further comprises a first transfer mechanism 201 for transferring a sintering-mold-and-tray from the carrier 233 to the elevator 200 and a second transfer mechanism 210 for transferring a sintering-mold-and-tray from the elevator 200 to the conveyor line for conveying them to the next process station.

The first transfer mechanism 201 comprises: a pair of horizontal guide rails 203, which are disposed on opposite sides of the elevator 200 and fixedly mounted on an upright sub-frame 114 of the frame 11 through brackets 202; a pair of slide heads 204 supported and guided by the guide rails 203, respectively, for movement along the guide rails 203; and a hydraulic cylinder (serving as an actuator) 205, which is fixedly mounted on the bracket 202 to extend parallel to and along one of the guide rails 203 (the one disposed on the left-hand side as viewed in FIG. 15). The ends of the slider heads 204 (the right-hand ends as viewed in FIG. 14) are interconnected through a pushing cross bar 206 extending therebetween. The pushing cross bar 206 serves to push a tray J (having a sintering mold placed thereon) in a horizontal direction toward a position at which the tray can be taken and lifted up by the elevator 200. The hydraulic cylinder 205 has a piston rod 205a, which is connected at the tip end thereof to an end of that one of the slide heads 204 which is the nearer to the hydraulic cylinder 205 than the other. Thus, reciprocation movement of the piston rod 205a causes the corresponding reciprocation movement of the slide heads 204 between positions L1 and L2 (shown in FIG. 14). The first transfer mechanism 201 further comprises a pair lift cylinders (hydraulic cylinders serving as actuators) 207 disposed on opposite sides of the transportation path of the carrier 223, for lifting up a tray J (having a sintering mold placed thereon) to the level for allowing the pushing cross bar 206 to push and move the tray J. The frame 11 includes a pair of horizontal beams 115 (only one of them is shown in FIG. 14) mounted on the pair of side members 112 of the frame 11. The first transfer mechanism 201 further comprises a plurality of feed rollers 208, 209 arranged in line (in horizontal direction in FIG. 14) and supported by the pair of horizontal beams 115 for rotation in a known manner. The feed rollers 208, 209 are capable of free rotation; when a tray J is pushed by the pushing cross bar 206, it is conveyed by means of the rollers 208, 209 to the position at which it can be picked up by the support bars 128 of the elevator 200.

The second transfer mechanism 210 comprises a launcher cylinder (a hydraulic cylinder serving as an actuator) 211 for launching a lifted-up tray from the uppermost position in the elevator 200 onto the conveyor line. In operation, when the carrier 223 carrying a tray has reached the takeout unit 20, the lift cylinder 207 is operated to lift up the tray. Then, the hydraulic cylinder 205 is operated to move the pushing cross bar 26 from the right to the left in FIG. 14, so that the tray is moved by the pushing cross bar 206 to the position at which the tray, having a sintering mold placed thereon, is loaded on the support bars 128 of the elevator 200. The tray thus loaded on the support bars 128 is lifted up by the elevator 200 to the uppermost position in the elevator 200, and then pushed out of the elevator 200 to the left in FIG. 14 and launched onto the conveyor line by the launcher cylinder 211.

Although not shown, there is provided near the location of the carrier 233 as indicated by imaginary lines in FIG. 14 a press core installer for fitting an upper press core m into the upper end portion of the bore b of a sintering mold, in which a finished powder compact is housed. The press core installer may comprise, for example, an industrial robot, which is operative to pick up an upper press core m by gripping its upper end; bring the upper press core m to the position just above the sintering mold a1, which is at this point of time placed on the carrier 233 located at the position as indicated by imaginary lines in FIG. 14; and lift down the upper press core m to fit it into the bore b of the sintering mold a1. Such an industrial robot is well known in the art and thus is not described in more detail here.

An exemplified sequence of operations provided by the apparatus 10 for loading powder material into a mold, constructed and arranged in accordance the first embodiment of the present invention will now be described in detail.

Sintering molds a1 are individually placed on associated trays J during transportation through the apparatus 10. As described, the trays J have an opening H formed therein. When the sintering mold dispenser unit 12 has dispensed onto the carrier 223 a tray J having a sintering molds a1 placed thereon, the carrier 233 is operated to move sequentially to the selected ones of the powder filling mechanisms 14 in the order appropriate for forming the plurality of powder layers in the sintering mold. When the carrier 223 is moved to the first of the selected powder filling mechanisms (typically, the carrier 223 is moved first to the powder filling mechanism located at the position A or position K), it is stopped under that powder filling mechanism and then positioned to the powder filling position of that mechanism with precision. Then, the receiving plate 230 is lifted up to raise the sintering mold a1 with the tray J to a predetermined level, at which the upper end of the sintering mold a1 is received in the opening 141a of the support plate 141 of the powder filling mechanism. At the same time, the push-up member 234 is lifted up a predetermined distance relative to the receiving plate 230 so as to raise the lower press core e to such a level that is appropriate for the filling of a desired amount of powder material into the sintering mold for the first powder layer. Then, the powder filling mechanism is operated in the manner described above so that the desired amount of powder material is filled into the bore of the sintering mold a1. When the powder filling operation has been done, the sintering mold is transported by the carrier 223 to the pressing position of the press unit 18, which then serves to press at a desired pressure the amount of powder material in the sintering mold, so as to form a precompressed powder compact. If another powder filling operation has to be carried out for the next powder layer to be formed in the sintering mold, either the sintering mold is displaced upward relative to the powder compact or the powder compact is displaced downward relative to the sintering mold while the powder compact is kept pressed, such that the vertical position of the powder compact within the sintering mold is adjusted to such a position that is appropriate for the filling of a desired amount of powder material into the sintering mold for the next powder layer. Then, the press unit 18 releases the sintering mold a1, and the carrier 223 transports the sintering mold a1 to the measuring position of the measure unit 16, at which the weight of the powder material in the sintering mold is measured in the manner described above.

This sequence of operations is repeated for each of the powder layers to be formed in the sintering mold, in which different powder filling mechanisms 14 are used for filling different powder materials into the sintering mold. The number of the total iterations of this sequence is equal to the number of the powder layers to be formed in the sintering mold. When the powder filling operation and the pressing or pre-compression operation for the last powder layer have been done, the vertical position of the finished, multi-layered powder compact within the sintering mold is adjusted to the position appropriate for the subsequent sintering process, by displacing the receiving plate 230 of the carrier 223 upward relative to the powder compact while the powder compact is kept pressed or retained by the press unit 18. Thereafter, the sintering-mold-and-tray having undergone the sequence of operations above is picked up from the carrier 233 by the sender unit 20.

Figure 16:
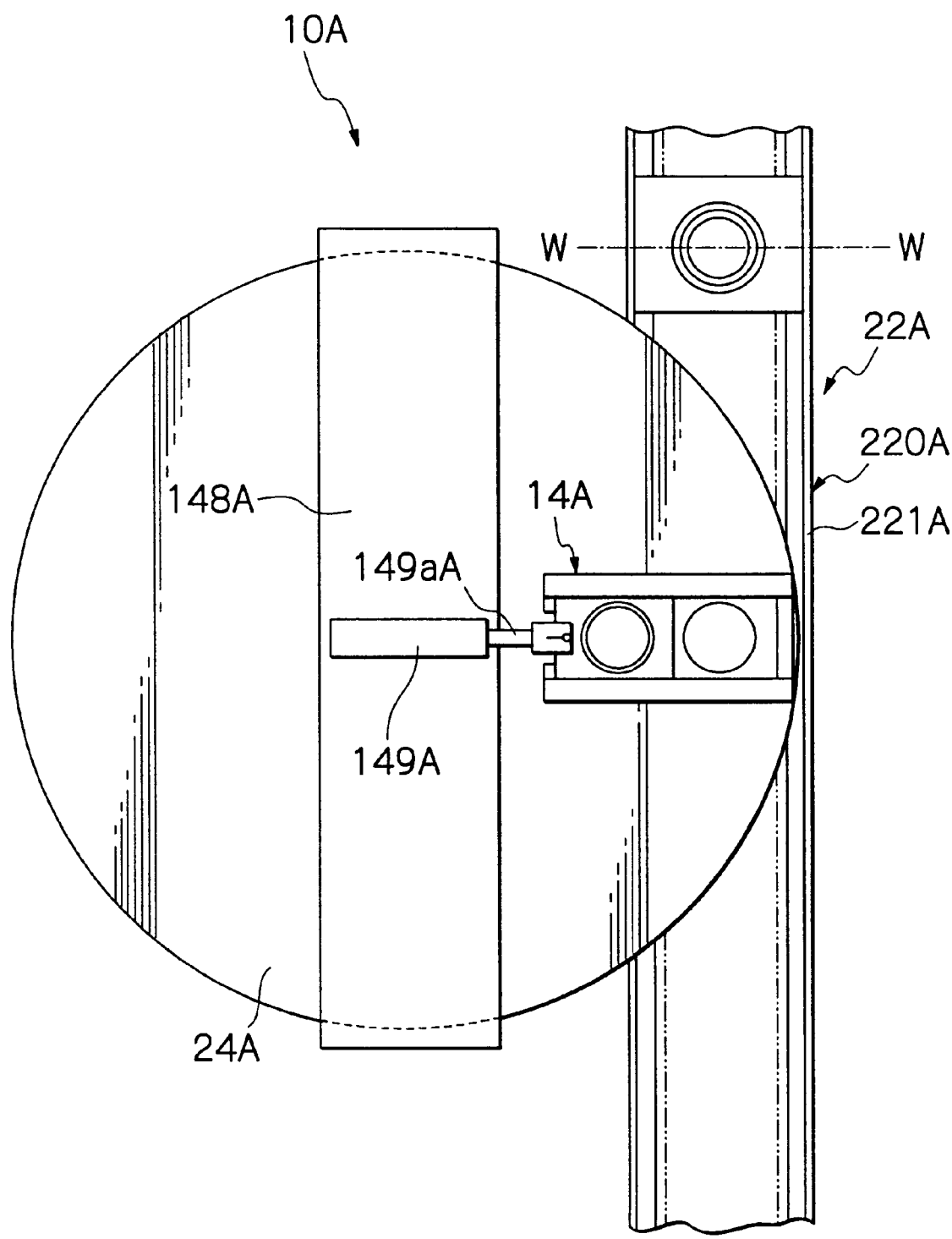
FIG. 16 is a schematic plan view of an apparatus for automatically loading powder material into a mold, constructed and arranged in accordance with a second embodiment of the present invention.

Referring next to FIGS. 16 to 20, we will describe an apparatus for loading powder material into a mold, constructed and arranged in accordance with a second embodiment of the present invention, together with an exemplified sequence of operations thereof carried out for loading powder materials into a sintering mold. FIG. 16 shows a schematic plan view of the automatic powder material loading apparatus 10A of the second embodiment. The automatic powder material loading apparatus 10A has a plurality of powder filling mechanism mounted on a rotary table so that different powder materials may be filled into and pressed within a sintering mold while the sintering mold is held at one position. This is a primary difference of the apparatus 10A from the that of the first embodiment described above. The automatic powder material loading apparatus 10A comprises a conveyor system 22A for conveying sintering molds together with associated trays along a predefined conveyance path; and a horizontal rotary table 24A supported for rotation about a vertical axis and driven for indexing movement by means of an indexing drive mechanism of a known type (not shown). The rotary table 24A partially extends over the conveyance path of the conveyor system 22A. The automatic loading apparatus 10A further comprises a lift/support unit 25A provided at a position at which a part of the rotary table 24A extends over the conveyor system 22A, for receiving a sintering mold from the conveyor system 22A and lifting up and supporting the received sintering mold; and a press unit 26A disposed above the lift/support unit 25A, for cooperating with the lift/support unit 25A to press at a desired pressure the amount of powder material filled into the sintering mold. The automatic powder material loading apparatus 10A further comprises a sintering mold dispenser unit (not shown) for dispensing sintering molds with associated trays onto the conveyor system 22A and a take-out unit (not shown) for picking up sintering molds with associated trays from the conveyor system 22A to send them to the next station, both of which are similar to those used in the first embodiment with apparent modifications effected thereto for meeting the requirements of the conveyor system 22A.

Figure 18:
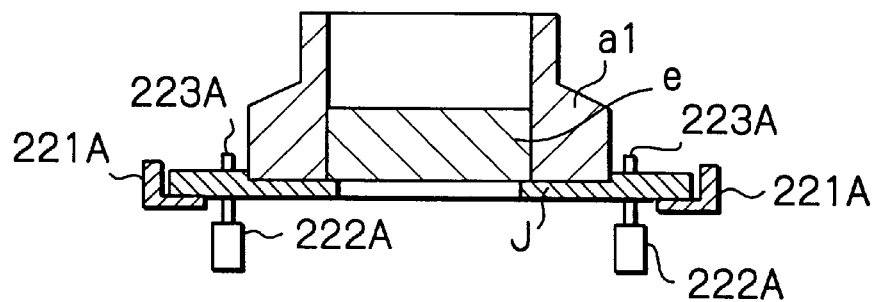
FIG. 18 is an enlarged section view of the apparatus of FIG. 16 taken along line W—W in FIG. 16.

With reference to FIGS. 16 and 18, the conveyor system 22A comprises a pair of horizontal guide rails 221A for supporting and guiding a tray J carrying a sintering mold, in which the tray J is supported at its side edges (with respect to the conveyance direction). The conveyor system 22A further comprises a driving device 220A for driving trays J supported by the guide rails 221A to move along the rails 221A. The driving device 220A may be a conventional chain drive comprising a pair of drive sprockets (not shown), a pair of idler sprockets (not shown) and a pair of endless chains 222A wound round these sprockets and extending along the respective guide rails 221A. Each endless chain 222A has a series of claws 223A (FIG. 18) provided there along at constant intervals, for engaging with and pushing respective trays when the endless chain 222A is driven to circulate. The guide rails 221A may be provided with a series of rollers at constant intervals for facilitating smooth movement of the trays. Also, the guide rails 221A may be provided with a pair of sub-rails extending parallel to and above the guide rails for preventing trays from rising off the guide rails 221A.

Figure 19:
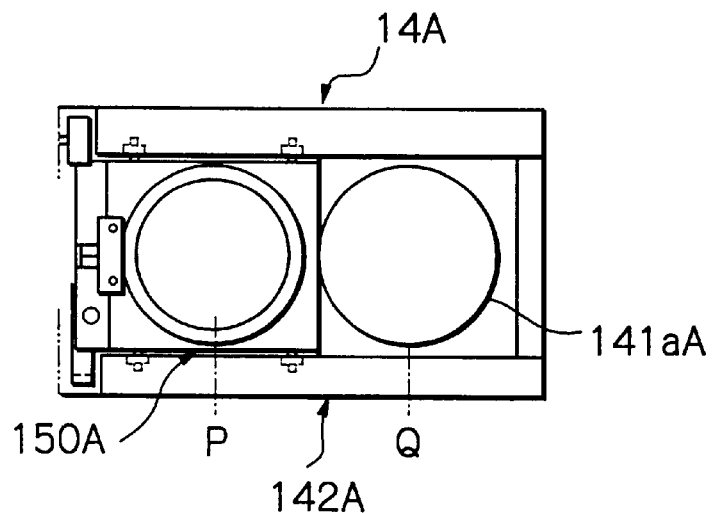
FIG. 19 is a plan view of a powder filling mechanism used in the apparatus of FIG. 16.
Figure 20:
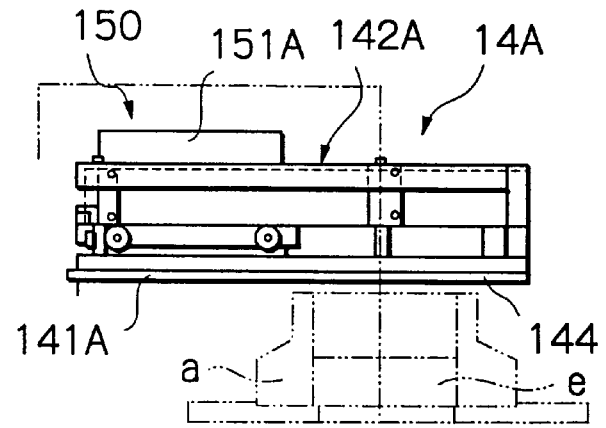
FIG. 20 is a section view of the powder filling mechanism of FIG. 19.
Figure 21:
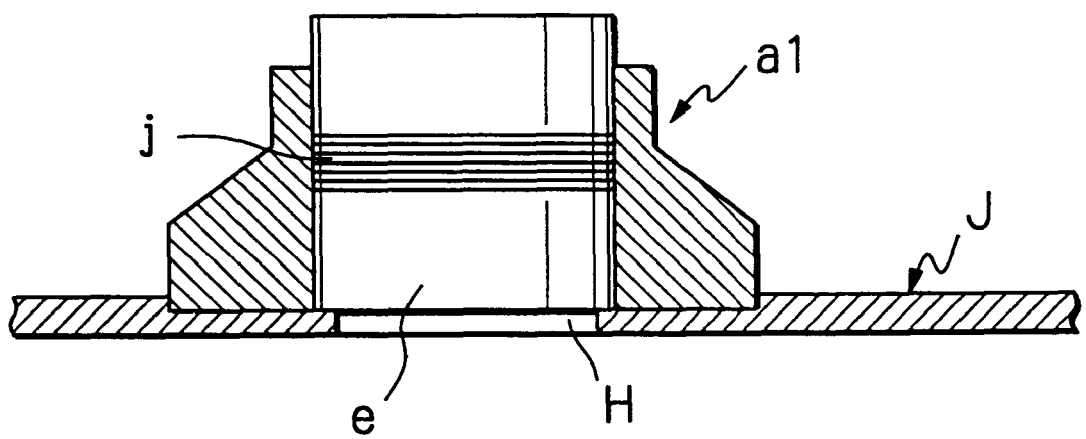
FIG. 21 is a section view of a sintering mold having been subjected to powder material loading process.

With reference to FIGS. 19 and 20, the powder filling mechanism 14A is similar in construction to the powder filling mechanism 14 used in the first embodiment, except for some differences that the powder filling mechanism 14A comprises a movable hopper which is movable on a horizontal support plate between position Q (at which the support plate has no opening) and position Q (at which the support plate has an opening) and that each powder filling mechanism 14A does not have its own hopper drive mechanism but a single hopper drive mechanism is used to drive any of the movable hoppers provided on the rotary table. In the following description, only these differences are described in detail, while like elements are not described in detail. The rotary table 24A, which is supported for rotation about the vertical axis as described above, has a plurality of openings 241A formed therein (FIG. 17) along its peripheral edge at constant angular intervals. The number of the openings 241A is equal to the number of the powder filling mechanisms 14A provided for the apparatus; however, FIG. 16 shows only one of the powder filling mechanisms 14A with the associated one of the openings 241A. A support frame 148A extend over the rotary table 24A. The hopper drive mechanism has an actuator comprising a hydraulic cylinder 149A with a piston rod 149a. The hydraulic cylinder 149A has a chuck of a known type attached to the tip end of the piston rod 149a, for selectively gripping one of the movable hoppers 150A. Each movable hopper 150A includes a hopper body 151A having an upright pin attached thereto, which is adapted to be gripped by the chuck of the hopper drive mechanism. When the rotary table 24A is indexed so as to bring a desired one of the powder filling mechanisms 14A to the powder filling position, the hopper drive mechanism is operated to grip the movable hopper 150A of that powder filling mechanism 14A by the chuck and moves the movable hopper 150A from position P to position Q and then back to position P so as to carry out the powder filling operation. As described above, the rotary table 24A is driven for indexing movement by means of the indexing drive mechanism of a known type (not shown), so that the rotary table is indexed or rotated about the vertical axis at constant intervals or at a predetermined pitch, which is equal to the pitch between adjacent two of the powder filling mechanisms 14A provided on the rotary table 24A.

Figure 17:
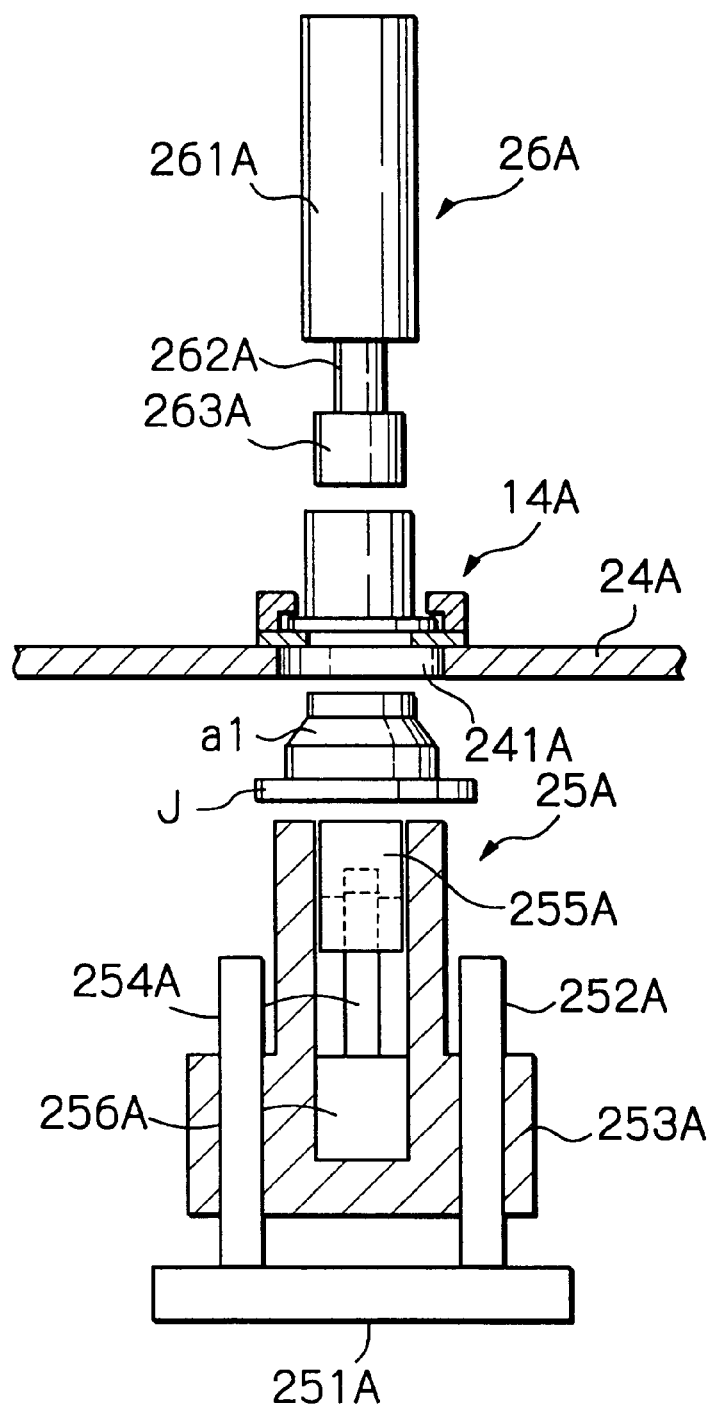
FIG. 17 is a section view of the apparatus of FIG. 16 taken along line V—V in FIG. 16.

With reference to FIG. 17, the lift/support unit 25A comprises: a base plate 251; a plurality of vertical guide rods 252A fixedly mounted on the base plate 251; a lift bed 253A guided by the vertical guide rods 252A and driven by a feed screw mechanism of a known type (not shown) for vertical displacement; a vertical screw spindle 254A supported by the lift bed 253A and driven by a drive motor (an electric motor) 256A of a known type; and a lower plunger 255A guided by the lift bed 253A for vertical displacement. The lower plunger 255A is received in a center hole formed in the upper end of the lift bed 253A and is capable of projecting upward from the top surface of the lift bed 253A. The lower plunger 255A has a vertical threaded hole extending therethrough, with which the vertical screw spindle 254A is in thread engagement, so that by rotation of the screw spindle 254A the lower plunger 255A is lifted up/down relative to the lift bed 253A. The lower plunger 255A, when lifted up, enters in the opening 141A of the support plate 141A of the powder filling mechanism 14A so as to push up the lower press core e fitted in the sintering mold. The upper end of the lift bed 253A is capable of engaging with the bottom of a tray so as to lift up the tray.

The press unit 26A comprises a press cylinder (an hydraulic cylinder) 261A, which is disposed just above the lift/support unit 25A and supported by a suitable support frame (not shown) and has a piston rod 262A extending in vertical direction. The press unit 26 further comprises an upper plunger or press member 263A attached to the tip end (i.e., the lower end) of the piston rod 262A. The upper plunger 263A of the press unit 26A and the lower plunger 255A of the lift/support unit 25A cooperate with each other to press the powder material in the sintering mold.

The automatic powder material loading apparatus 14A of the second embodiment operates as follows. When a sintering mold placed on a tray J has been conveyed to the powder filling position, the lift bed 253A of the lift/support unit 25A is lifted up to raise the tray J to a level at which the upper end of the sintering mold a1 is received in the opening 141A of the support plate 141A and the top surface of the support plate 141A becomes level with the top surface of the sintering mold a1. Then, the lower plunger 255A is lifted up to displace upward the lower press core e fitted in the bore b of the sintering mold a1, until the distance (or depth) of the top surface of the lower press core e from the top surface of the sintering mold is reduced to a desired distance (or desired depth), which corresponds to the thickness of the first layer of powder to be filled into the mold. Then, the selected one of the powder filling mechanisms 14A is operated to carry out the powder filling operation for the first powder layer. When the powder filling operation has been done, the press cylinder 261A of the press unit 26A is operated to lower the upper plunger or press member 263A to press at a desired pressure the amount of powder material in the sintering mold, so as to form a powder compact of the first powder layer. Then, the upper and lower plungers or press member 263A and 255A are displaced downward while keeping the powder compact of the first layer in the sintering mold pressed therebetween, until the thickness of the space defined within the sintering mold and above the powder compact of the first powder layer is increased to reach a desired thickness (which corresponds to the thickness of the second layer of powder material to be filled next). Then, the upper plunger is lifted up to leave the sintering mold. The rotary table is then indexed to bring the powder filling mechanism 14A that stores the powder material for the second powder layer to the powder filling position, in order to allow that powder filling mechanism 14A to carry out the powder filling operation for the second powder layer. Thereafter, the sequence of operations described above is repeated for each of the powder layers to be formed in the sintering mold one on another. In this manner, a multi-layered powder compact is finished while the sintering mold is held at the powder filling position during the whole sequence of the powder filling operations. When the powder compact is finished, the upper and lower plungers 263A and 255A are lowered while keeping the finished powder compact in the sintering mold pressed therebetween, until the multi-layered powder compact is brought to a desired vertical position relative to the sintering mold. The whole sequence of operations for loading powder in the sintering mold is completed at this point of time. It is noted that the upper plunger 263A is fitted tight in the bore of the sintering mold in order to prevent escape of any powder from the sintering mold (if there were clearance between the outer surface of the upper plunger and the inner surface of the bore of the mold, some of the powder could possibly escape through the clearance), so that the upper plunger tends to pull up the sintering mold when lifted up. In order to prevent the sintering mold from being lifted up thereby, a clamp (not shown) is provided to grip the sintering mold to retain it at the powder filling position.

Figure 22:
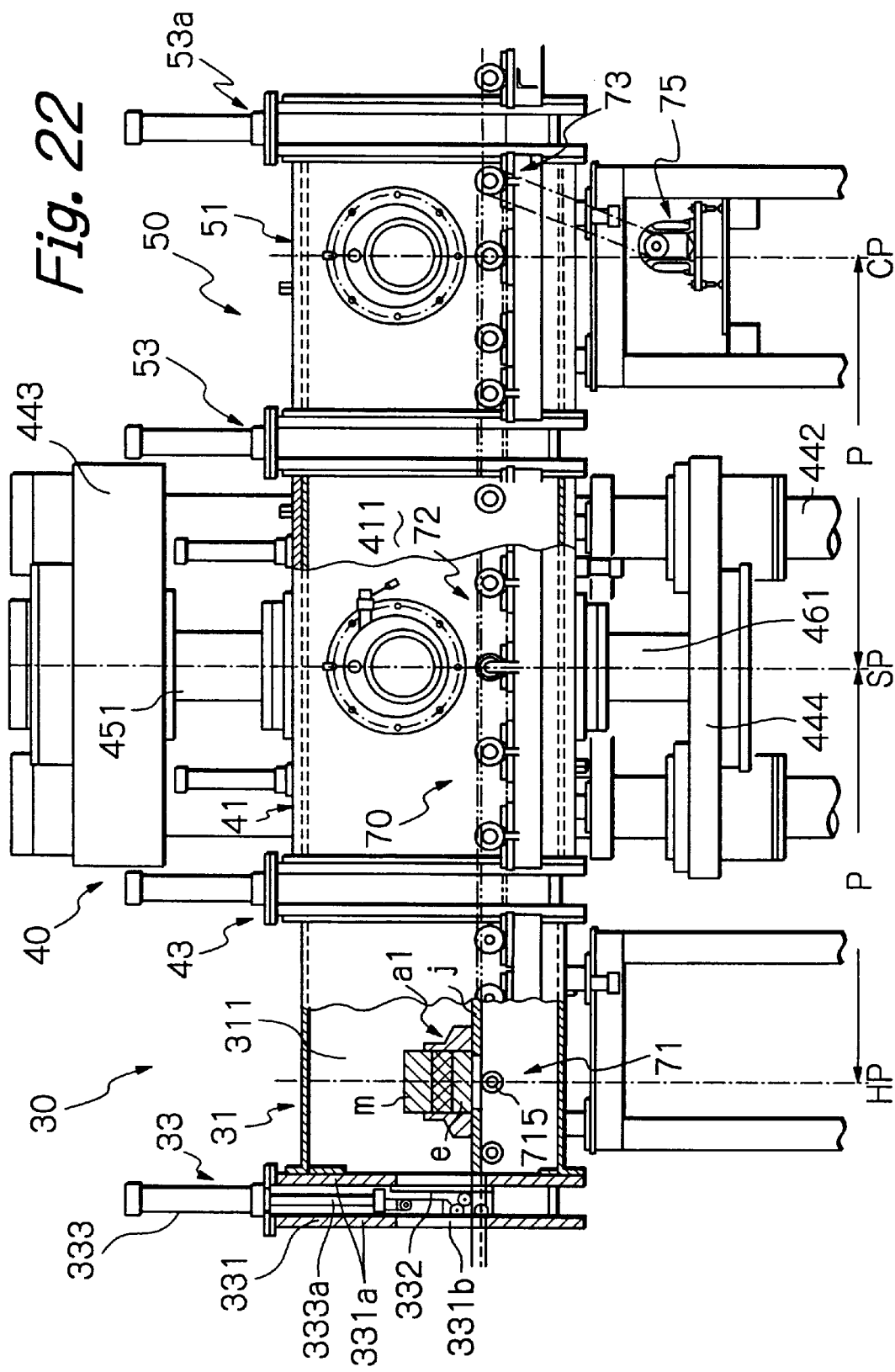
FIG. 22 is a side elevation view of a pre-heating unit, a sintering unit and a cooling unit.
Figure 23:
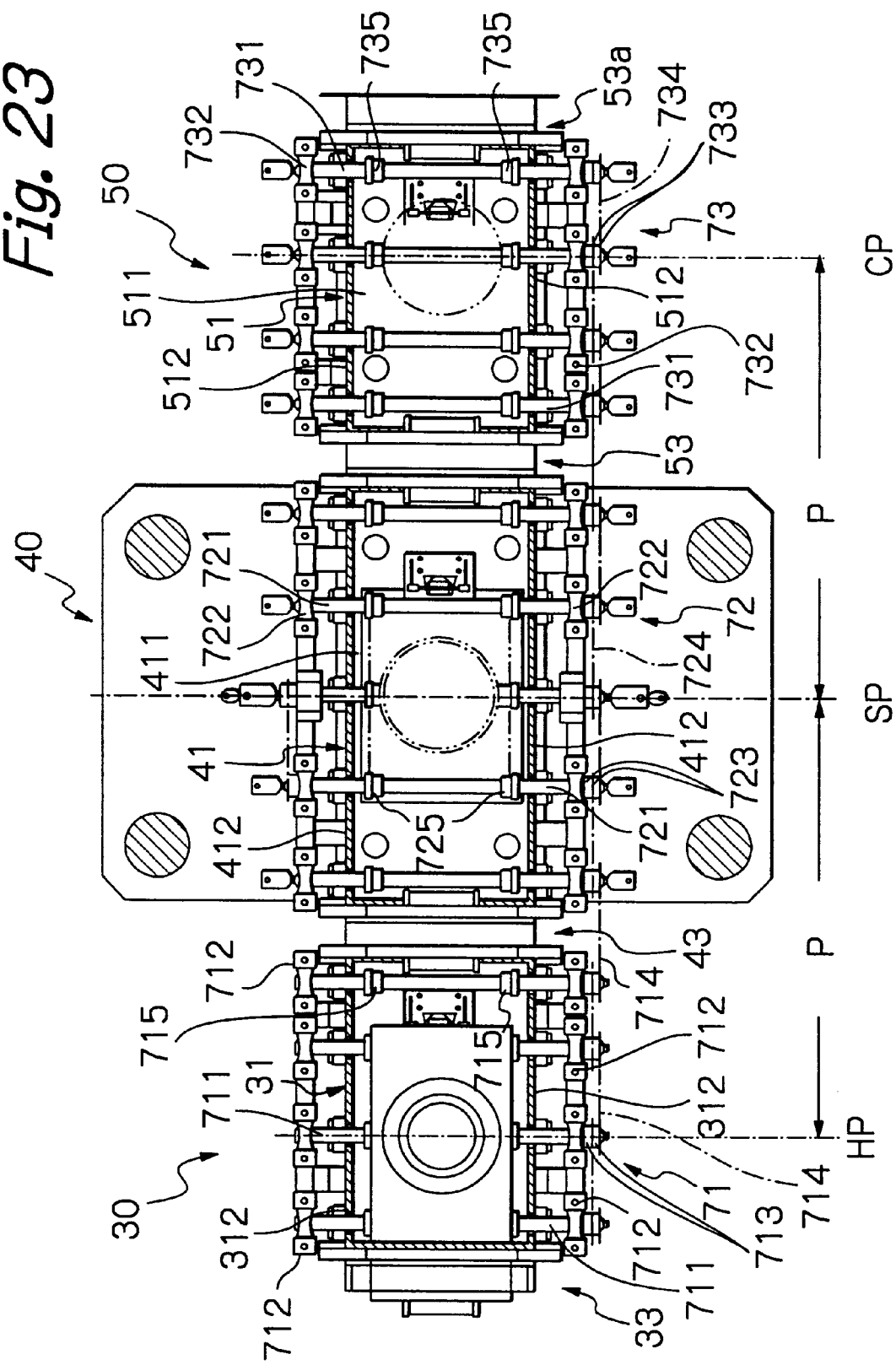
FIG. 23 is a sectional plan view of the pre-heating unit, the sintering unit and the cooling unit of FIG. 22.
Figure 24:
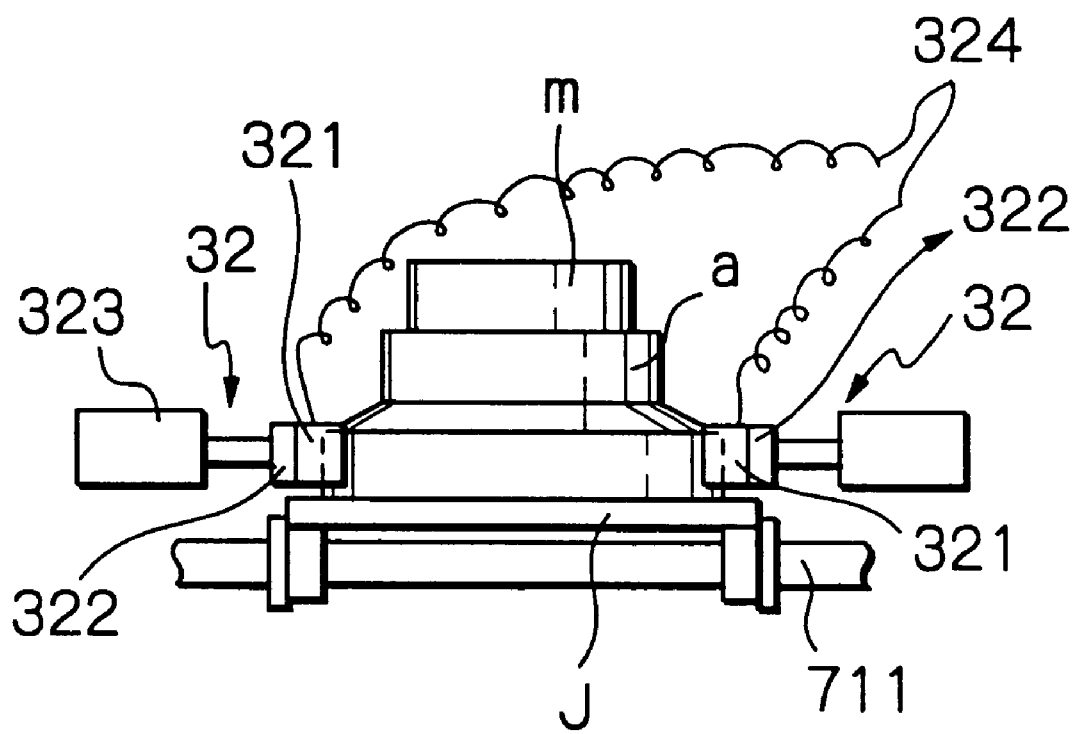
FIG. 24 illustrates the pre-heating unit of FIG. 22 in operation.

With reference to FIGS. 22 and 23, there are shown a side elevation view and a plan view, respectively, of an arrangement including the pre-heating unit 30, the sintering unit 40 and the cooling unit 50 disposed in series. The conveyor 70 includes first, second, third and fourth conveyor sections 71, 72, 73 and 74, which serve to convey the tray through the pre-heating unit 30, the sintering unit 40, the cooling unit 50 and the pushing-out unit 60, respectively. The pre-heating unit 30 comprises a housing 31 defining a pre-heating chamber 311, in which the first conveyor section 71 is housed. The inside of the pre-heating chamber 311 can be isolated from the environment by virtue of the arrangement described below. The housing 31 is generally of a rectangular box-like shape, somewhat elongated in the longitudinal direction of the conveyor 70. The housing 31 has an entrance and an exit for the sintering mold to be conveyed into and out of the housing 31 by the conveyor 70, which are provided at the opposite ends of the housing 31, respectively. The housing 31 also includes a pair of side walls 312 having through holes formed therein, through which the ends of rollers 711 of the first conveyor section 71 extend out of the housing 31, with each of the rollers 711 being supported for rotation at its opposite ends by a pair of bearings 712 disposed outside the housing 31. The rollers 711 are driven to rotate in synchronism with each other. The rollers 711 are provided with sealing members of a known type for sealing the clearance between each of the rollers 711 and the associated openings of the side walls 312 to prevent communication between the inside and the outside of the pre-heating chamber 311 through the clearance. The pre-heating chamber 311 is in communication with the first atmosphere control unit 81, which serves to control the atmosphere inside the pre-heating chamber 311. The atmosphere inside the pre-heating chamber 311 may be chosen from a variety of atmospheres including a vacuum atmosphere (either low or high vacuum atmosphere), an inert gas atmosphere (either cold or hot inert gas atmosphere) and many other atmospheres suitable for the purpose, which may be controlled with ease in a known manner. The pre-heating of the sintering mold may be carried out by using any of various heating techniques either solely or in any combination thereof. Such heating techniques include: applying heat to the sintering mold from an external heat generator; using a high-frequency electromagnetic induction heater to generate heat in the sintering mold; supplying hot gas into the chamber to heat the sintering mold; and others. In this embodiment, as shown in FIG. 24, a pair of electric current supply devices 32 are provided in the pre-heating chamber 311. The pair of electric current supply devices 32 are disposed on opposite sides of the conveyor and facing to each other. The electric current supply devices 32 are capable of contact with opposite sides of the sintering mold to establish electrical connection between the power supply unit 90 and the sintering mold, so as to apply pre-heating current to the sintering mold to generate resistive heat in the sintering mold. Each electric current supply device 32 includes a cylinder (actuator) 323 having a push rod, and a contact member 321 attached to the push rod of the cylinder 323 through an insulating member 322. The contact members 321 are in electrical connection through respective wires 324 with pre-heating power supply circuitry in the power supply unit 90.

A first gate 33, which is similar in structure to a gate valve, is provided at the entrance of the housing 31 (at the left-hand end of the housing 31, as seen in FIGS. 22 and 23), for selectively blocking the inside of the housing 31 from the outside thereof. The first gate 33 includes: a body 33 composed of a pair of parallel plates 331a having respective openings 331b formed therein; a gate plate 332 received in the body 331 for vertical displacement; and an actuator 333 for lifting up/down the gate plate 332. In this embodiment, the actuator 333 comprises a hydraulic cylinder having a piston rod 333a. The gate plate 332 is connected to the tip end (lower end) of the piston rod 333a. With this arrangement, the gate plate 332 is lifted up/down by the actuator (the hydraulic cylinder) 333, so that the entrance of the housing 31 may be selectively opened/closed.

In operation, a tray J having a sintering mold a1 placed thereon is introduced through the gate 33 (which is then in open position) into the pre-heating chamber 311 by the first conveyor section 71. The introduced tray J reaches a predetermined pre-heating position HP in the pre-heating chamber 311, when the operation of the first conveyor section 71 is stopped so that the sintering mold a1 on the tray J is held at the pre-heating position HP. Then, the first gate 33 is closed and the first atmosphere control unit 81 is activated. In the case where an inert gas atmosphere has been chosen, the atmosphere control unit 81 begins to supply inert gas into the pre-heating chamber 311. If a vacuum atmosphere has been chosen, the atmosphere control unit 81 supplies vacuum so as to evacuate the pre-heating chamber 311. Simultaneously, or subsequently, the cylinders 323 of the electric current supply devices 32 are actuated to cause the contact members 321 to come into contact with the sintering mold a1 on the tray J, and then the sintering mold a1 is applied with pre-heating current from the pre-heating power supply circuitry in the power supply unit 90 through the electric current supply devices 32, so that pre-heading is effected to the sintering mold a1. In the case where an additional pre-heating means, such as an external heat generator or an electromagnetic induction heater, is provided, such means may be activated simultaneously. The pre-heating current may be either continuous current or pulsed current. In the case where an inert gas atmosphere is chosen, either hot inert gas or cold inert gas (at room temperature) may be supplied into the pre-heating chamber 311. The pre-heating temperature depends on the properties of the powder material used and/or desired effects of the sintering process. For example, the temperature may be preferably in the range from about 200 to 800 degrees centigrade, or from about 30% to 80% of the sintering temperature.

With reference to FIGS. 22 and 23, the sintering unit 40 comprises a housing 41 defining a sintering chamber 411, in which the second conveyor section 72 is housed. The inside of the sintering chamber 311 can be isolated from the environment by virtue of the arrangement described below. The housing 41 is generally of a rectangular box-like shape, somewhat elongated in the longitudinal direction of the conveyor 70. The housing 41 has an entrance and an exit for the sintering mold to be conveyed into and out of the housing 41 by the conveyor 70, which are provided at the opposite ends of the housing 41, respectively. The housing 41 also includes a pair of side walls 412 having through holes formed therein, through which the ends of rollers 721 of the second conveyor section 72 extend out of the housing 41, with each of the rollers 721 being supported for rotation at its opposite ends by a pair of bearings 722 disposed outside the housing 41. The rollers 721 are driven to rotate in synchronism with each other. The rollers 721 are provided with sealing members of a known type for sealing the clearance between each of the rollers 721 and the associated openings of the side walls 412 to prevent communication between the inside and the outside of the sintering chamber 411 through the clearance. The sintering chamber 411 is in communication with the second atmosphere control unit 82, which serves to control the atmosphere inside the sintering chamber 411 independently or separately from the atmosphere inside the pre-heating chamber 311 as well as from the atmosphere inside a cooling chamber described below. The atmosphere inside the sintering chamber 411 may be chosen from a variety of atmospheres including a vacuum atmosphere (either low or high vacuum atmosphere), an inert gas atmosphere and many other atmospheres suitable for the purpose, which may be controlled with ease in a known manner. A second gate 43 is provided between the exit of the housing 31 of the pre-heating unit 30 (at the right-hand end of the housing 31, as seen in FIGS. 22 and 23) and the entrance of the housing 41 of the sintering unit 40, for selectively blocking the communication between the pre-heating chamber 311 and the sintering chamber 411. The second gate 34 is identical in structure and operation to the first gate 33, and is not described in detail for simplicity.

Figure 25:
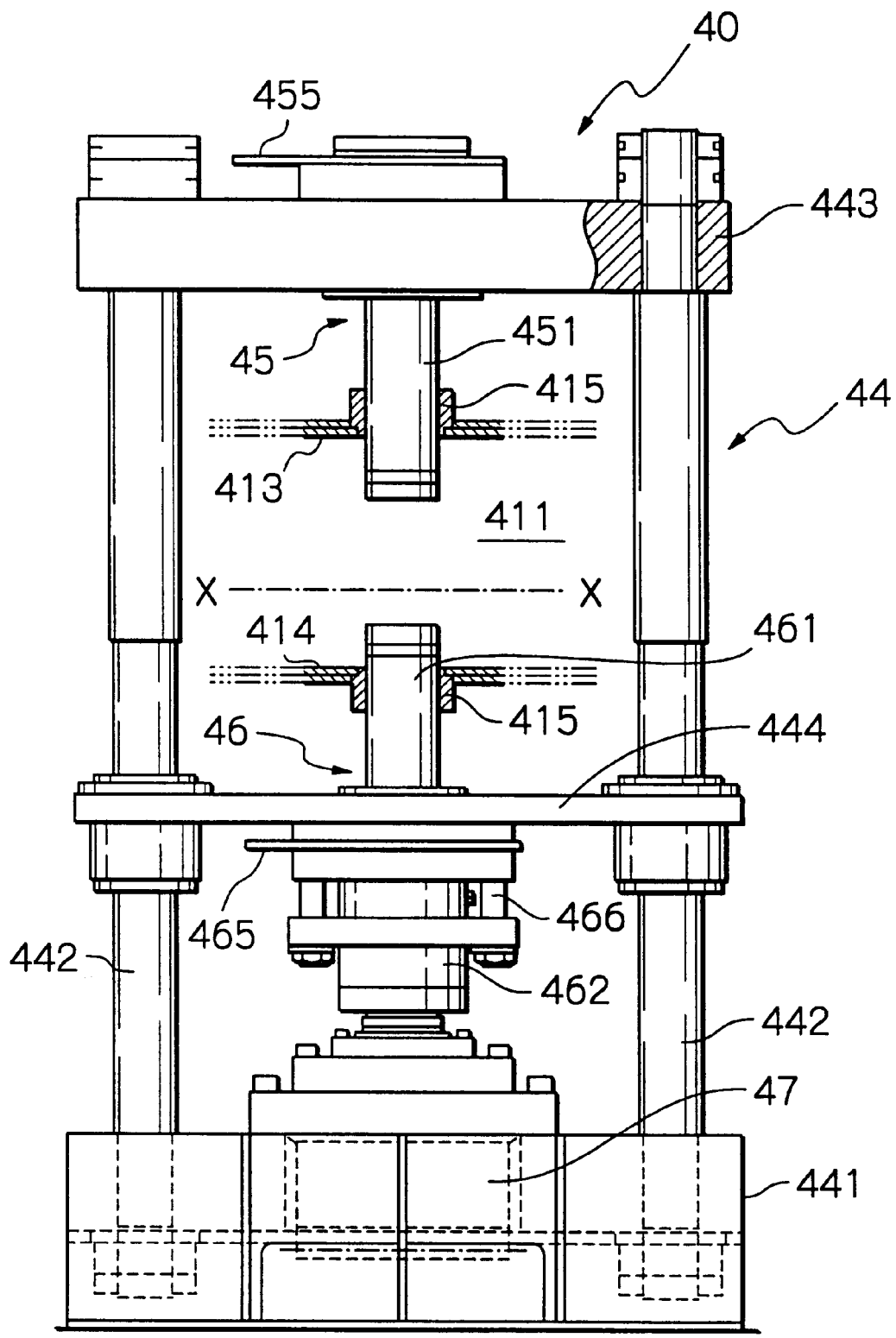
FIG. 25 is a side elevation view of the sintering unit of FIG. 22.
Figure 26:
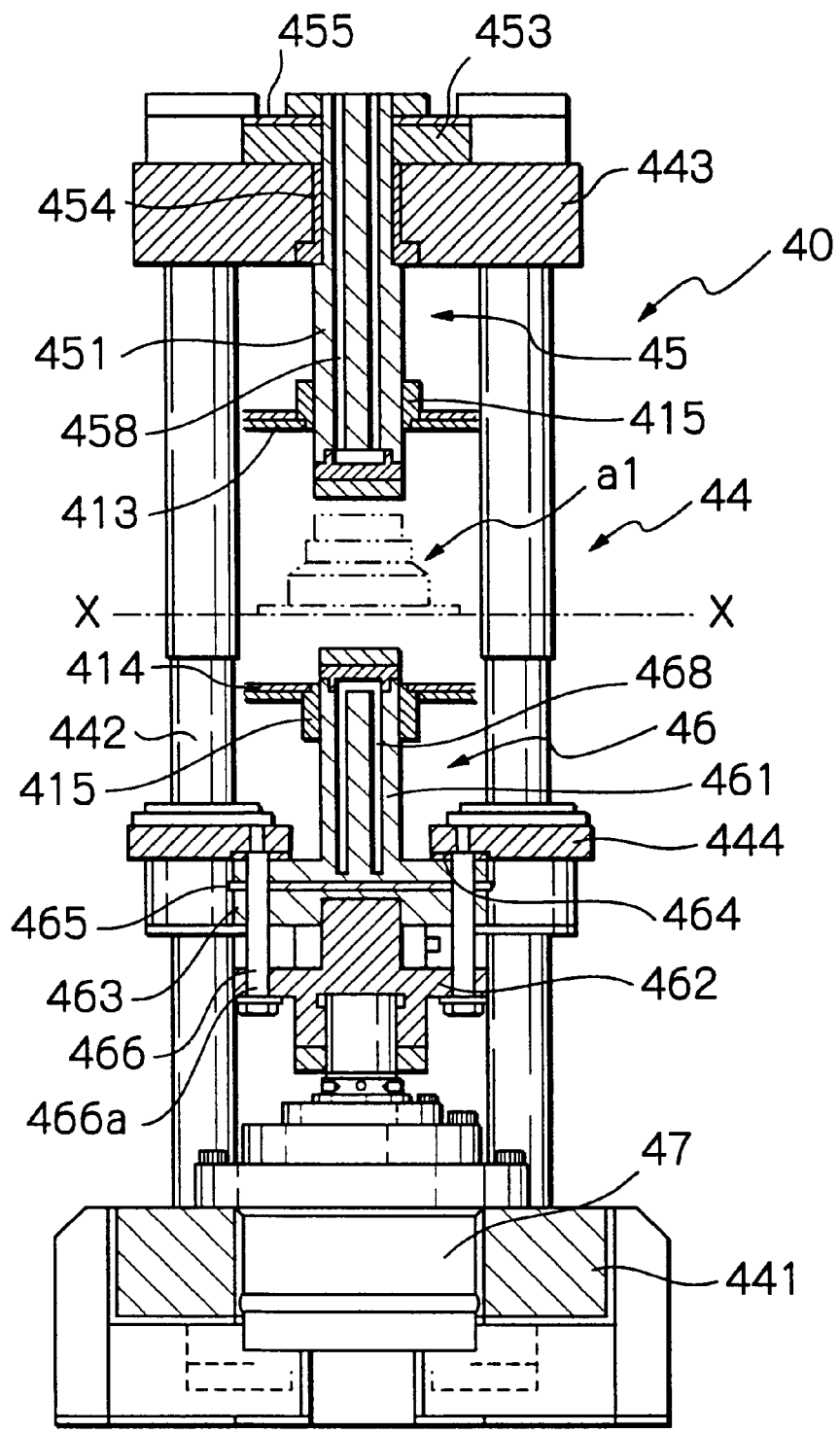
FIG. 26 is a longitudinal section view of the sintering unit of FIG. 22.
Figure 27:
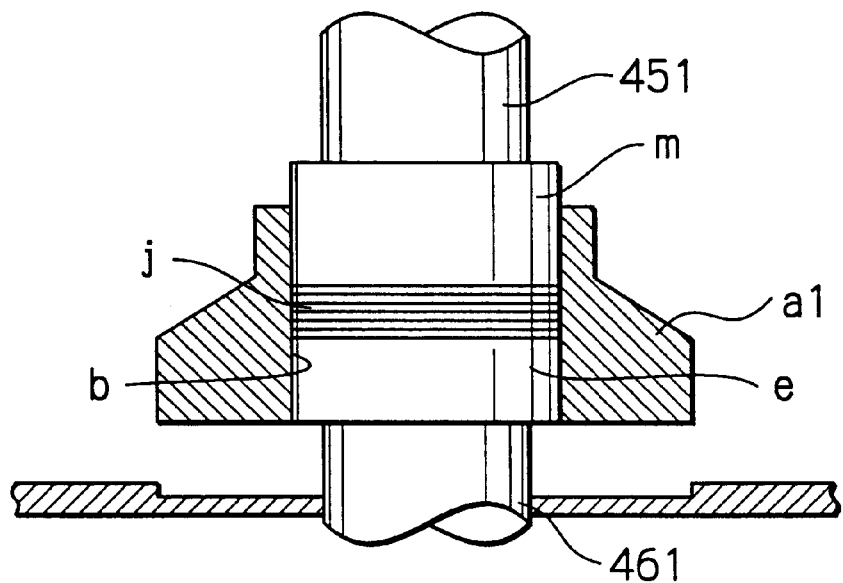
FIG. 27 is an enlarged section view of the sintering mold, showing upper and lower plunger electrodes and upper and lower press cores.

With reference to FIGS. 25 and 26, the sintering unit 40 further comprises a support structure 44. The support structure 44 comprises: a generally rectangular base plate 441; four vertical posts 442 mounted on the base plate 441 at respective corners thereof and extending upward from the base plate 441; a top support plate 443 fixedly mounted on the upper ends of the vertical posts 442; and a movable plate 444 disposed between the base plate 441 and the top support plate 443 and guided by the vertical posts 442 for vertical displacement. The sintering unit 40 further comprises an upper electrode assembly 45 mounted the top support plate 443, a lower electrode assembly 46 mounted on the movable plate 444; and an actuator 47 for driving and displacing the movable plate 444 in vertical direction. While the actuator 47 is a hydraulic cylinder in this embodiment, any other actuators, such as a driving unit using an electric motor, may be also used as the actuator 47. The upper electrode assembly 45 includes an upper conductive member or electrode 451 of a plunger type fixedly connected to the top support plate 443 through an insulating plate 453 and an insulating sleeve 454. The upper electrode 451 is electrically connected to sintering power supply circuitry in the power supply unit 90 through a conductive lead plate 455. The upper conductive member or electrode 451 has coolant passages 458 bored therein, for allowing coolant, such as water, to flow therein. Coolant is supplied from a coolant supply source (not shown) and is circulated in the coolant passages 468 to cool the upper electrode 451. The lower electrode assembly 46 includes a lower conductive member or electrode 461 of a plunger type fixedly connected to the movable plate 444 through a bracket 462 and fastening bolts 466, with an insulating plate 463 and an insulating sheet 464 being provided for insulating the lower electrode 461 from the movable plate 444. The lower electrode 461 is electrically connected to the sintering power supply circuitry in the power supply unit 90 through a conductive lead plate 465. Each fastening bolt 466 has a stem 466a having its outer surface coated with an insulating layer. The lower conductive member or electrode 461 has coolant passages 468 bored therein, for allowing coolant to flow therein. Coolant is supplied from the coolant supply source and is circulated in the coolant passages 468 to cool the lower electrode 461. The hydraulic cylinder 47 has a piston rod 471 in engagement with the bracket 462, so that the operation of the hydraulic cylinder 47 will cause vertical displacement of the bracket 462 and thus of the lower electrode assembly 46. The housing 41 has a top wall 413 having an opening formed therein, through which the upper electrode 451 extends into the sintering chamber 411. The housing 41 also has a bottom wall 414 having an opening formed therein, through which the lower electrode 461 extends into the sintering chamber 411. Each of the upper and lower electrodes 451 and 461 has a sealing member 415 for sealing the clearance between the plunger electrode and the associated opening. Between the conductive lead plate 465 and the bracket 462, an insulating sheet is provided. The upper and lower electrode are made of stiff material such as stainless steel so that they can apply considerable axial pressure to the upper and lower press cores.

In operation, a tray J having a sintering mold al placed thereon is introduced into the sintering chamber 411 by the second conveyor section 72, with the bottom of the tray J being maintained at the level of the conveyance plane X—X of the conveyor section 72. The introduced tray J reaches a predetermined sintering position SP (at which the coaxis of the upper and lower electrodes and the axis of the sintering mold will be in alignment with each other), when the operation of the second conveyor section 72 is stopped so that the sintering mold a1 on the tray J is held at the sintering position SP. Then, the hydraulic cylinder 47 is operated to lift up the movable plate 444 and thus the lower electrode assembly 46 mounted thereon. The upper end of the lower conductive member or electrode 461 thereby enters in the hole H of the tray J, so that the top surface of the lower electrode 461 comes into engagement with the bottom surface of the lower press core e fitted in the lower end of the bore L of the sintering mold a1, and then the lower electrode 461 lifts up the sintering mold a1 together with the lower press core e and the upper press core m fitted therein as well as with the powder compact housed therein.

As the result, the top surface of the upper press core m fitted in the upper end of the bore b of the sintering mold a1 comes into engagement with the bottom surface of the upper electrode 461, so that the powder compact housed in the sintering mold is pressed at a desired pressure by the upper and lower electrodes 451 and 461. At the same time, DC pulsed current having a predetermined current level and a predetermined pulse duration is applied from the sintering power supply circuitry in the power supply unit 90 through the upper and lower electrodes 451 and 461 to the powder compact in the sintering mold. In this manner, pulsed-current electrical sintering, such as plasma-arc sintering or plasma-activated sintering, is effected to the powder compact in the sintering mold. In the sintering unit 40 of this embodiment, the upper and lower electrodes 451 and 461 have a rod-like shape with a circular cross section of the same diameter, which is smaller than the inner diameter of the bore b of the sintering mold a1. Here, the diameter of the electrodes 451 and 461 has to be smaller than the inner diameter of the bore b because the lower plunger electrode 451 has to be capable of extending through the opening H formed in the tray J to directly come into engagement with and push the lower press core e, while the inner diameter of the opening H is smaller than that of the bore b. The current level and the current applying time of the DC pulsed current depend on the diameter of the sintered product (and thus the diameter of the bore b of the sintering mold), the thickness of the sintered product (and thus the total thickness of the power layers in the powder compact in the sintering mold) and properties of the powder materials used to form the powder layers. Typically, the voltage applied between the electrodes 451 and 461 is less than 100 V (volts) and the current applied is higher than 6,000 A (amperes). In this embodiment, the top surface of the lower electrode 461 is capable of contact with only the bottom surface of the lower press core a, so that the current applied will not flow directly from the lower plunger electrode 461 to the sintering mold (or vice versa) but will flow from the lower electrode 461 to the lower press core e (or vice versa).

Figure 28:
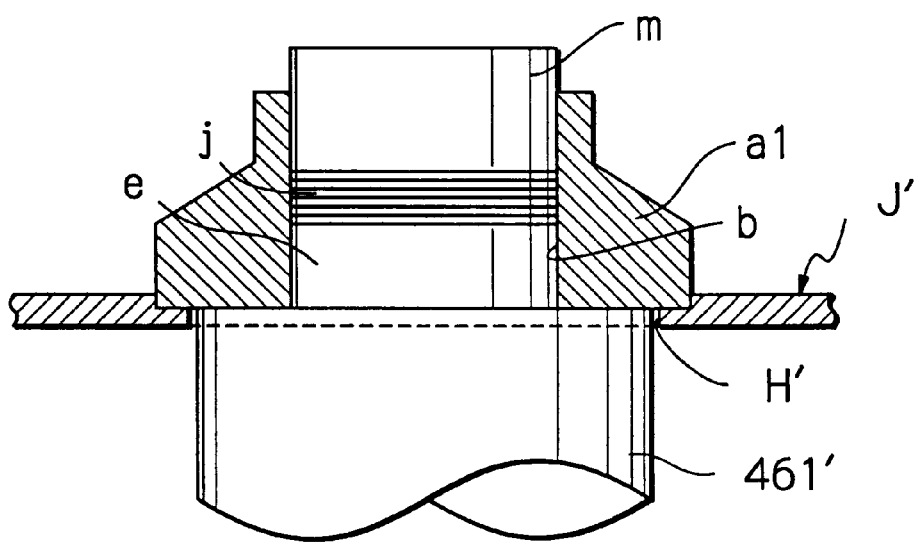
FIG. 28 is an enlarged section view of the sintering mold, showing a modified lower plunger electrode.

FIG. 28 shows a modified lower conductive member or electrode 461' of a plunger type together with a modified tray J'. The lower electrode 461' has a greater diameter, so that the top surface of the lower electrode 461' is capable of contact with the bottom surface of the sintering mold a1 at the region along the edge of the bore b and the bottom surface of the lower press core e at the same time. The modified tray J' has an opening H' whose diameter is greater than that of the opening H of the above described tray J, so that the sintering mold is supported by the tray J' only at the region along the outer periphery of the bottom surface of the sintering mold. While not supported by the tray J', the lower press core e will not drop off the bore b of the sintering mold by gravity because it is fitted tight in the bore b as described above (i.e., the lower core can be displaced in the sintering mold only when applied with a sufficient force). Here, the lower electrode 461' is capable of direct contact with the sintering mold a1, so that current applied will flow directly from the lower electrode 461' to both the sintering mold a1 and the lower press core e (or vice versa). Thus, under certain conditions, it may be preferable to provide a set of lower electrodes of different diameters and chose one of them for use depending on the parameters for the sintering process to be carried out. In addition, the upper electrode 451 may be also modified to have an outer diameter greater than the inner diameter of the bore b of the sintering mold, only if the upper press core is fitted in the bore with its upper end always protruding out of the bore, so that the top surface of the upper press core is always above the top surface of the sintering mold.

Figure 29A:
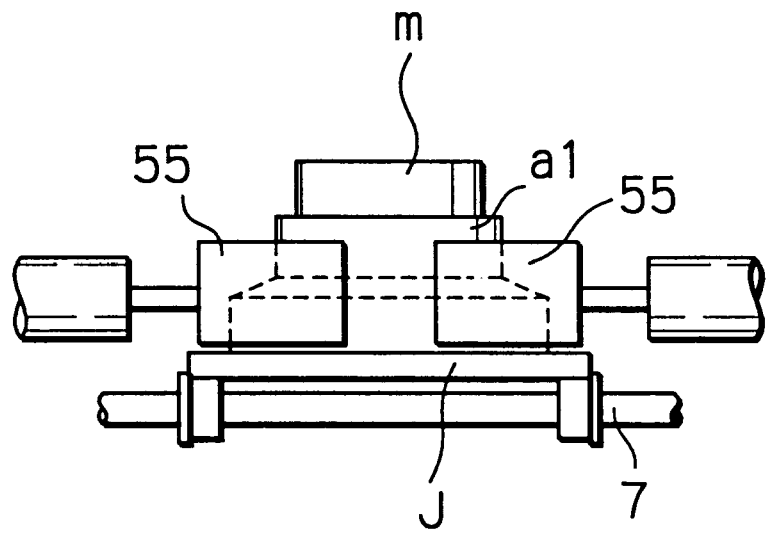
FIG. 29A illustrates another cooling arrangement for cooling the sintering mold in operation.
Figure 29B:
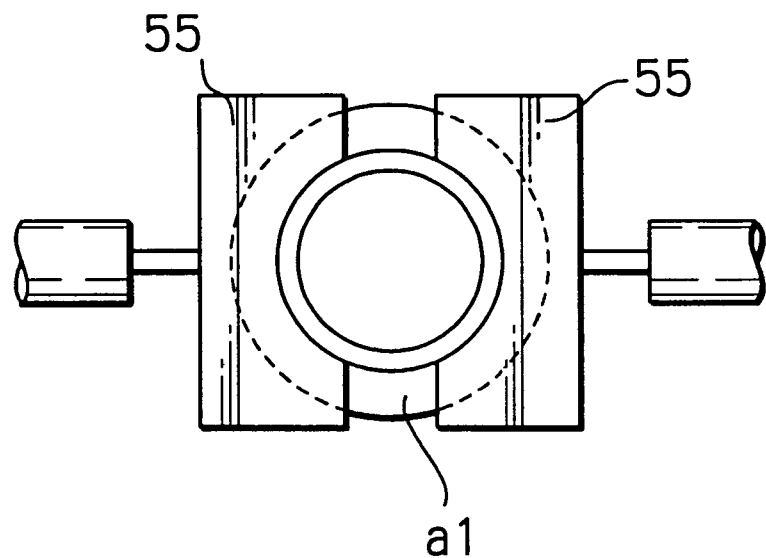
FIG. 29B is a plan view of the cooling arrangement of FIG. 29A.

With reference to FIGS. 22 and 23, the cooling unit 50 comprises a housing 51 defining a cooling chamber 511, in which the third conveyor section 73 is housed. The inside of the cooling chamber 511 can be isolated from the environment by virtue of the arrangement described below. The housing 51 is generally of a rectangular box-like shape, somewhat elongated in the longitudinal direction of the conveyor 70. The housing 51 has an entrance and an exit for the sintering mold to be conveyed into and out of the housing 51 by the conveyor 70, which are provided at the opposite ends of the housing 51, respectively. The housing 51 also includes a pair of side walls 512 having through holes formed therein, through which the ends of rollers 731 of the third conveyor section 73 extend out of the housing 51, with each of the rollers 731 being supported for rotation at its opposite ends by a pair of bearings 732 disposed outside the housing 51. The rollers 731 are driven to rotate in synchronism with each other. The rollers 731 are provided with sealing members of a known type for sealing the clearance between each of the rollers 731 and the associated openings of the side walls 512 to prevent communication between the inside and the outside of the cooling chamber 511 through the clearance. The cooling chamber 511 is in communication with the third atmosphere control unit 83, which serves to control the atmosphere inside the cooling chamber 411. A third gate 53 is provided between the exit of the housing 41 of the sintering unit 40 (at the right-hand end of the housing 41, as seen in FIGS. 22 and 23) and the entrance of the housing 51 of the cooling unit 50, for selectively blocking the communication between the sintering chamber 411 and the cooling chamber 511. A fourth gate 53a is provided at the exit of the housing 51 of the cooling unit 50. The third and fourth gates 53 and 53a are identical in structure and operation to the first gate 33, and are not described in detail for simplicity. The third atmosphere control unit 83 supplies cooling gas, such as cold inert gas cooled in the unit 83, into the cooling chamber 511 of the cooling unit 50. In operation, a tray J having a sintering mold a1 placed thereon, which has been subjected to the sintering process in the sintering unit 40, is introduced into the cooling chamber 511 by the third conveyor section 73. The introduced tray J reaches a predetermined cooling position CP in the cooling chamber 511, when the operation of the third conveyor section 73 is stopped so that the sintering mold is held at the cooling position CP and then subjected to the cooling process at the position. The cooling unit 50 may be additionally provided with a cooling mechanism to be disposed in the housing 51, which may include, as shown in FIG. 29, a pair of cooling blocks 55 cooled by coolant and supported and actuated by a pair of actuator or hydraulic cylinders. The cooling blocks are disposed on opposite sides of the conveyer section 73 and facing to each other, and are movable in horizontal direction perpendicular to the moving direction of sintering mold by the conveyor section 73, such that they are capable of contact with the sintering mold from opposite directions. Each of the gates 33, 43, 53 and 53a is controlled to be normally at closed position (so as to close the entrance or exit of the associated housing 311, 411 or 511 to establish substantially gas-tight chamber therein), and to be opened only when a tray with a sintering mold placed thereon is conveyed therethrough.

Figure 31:
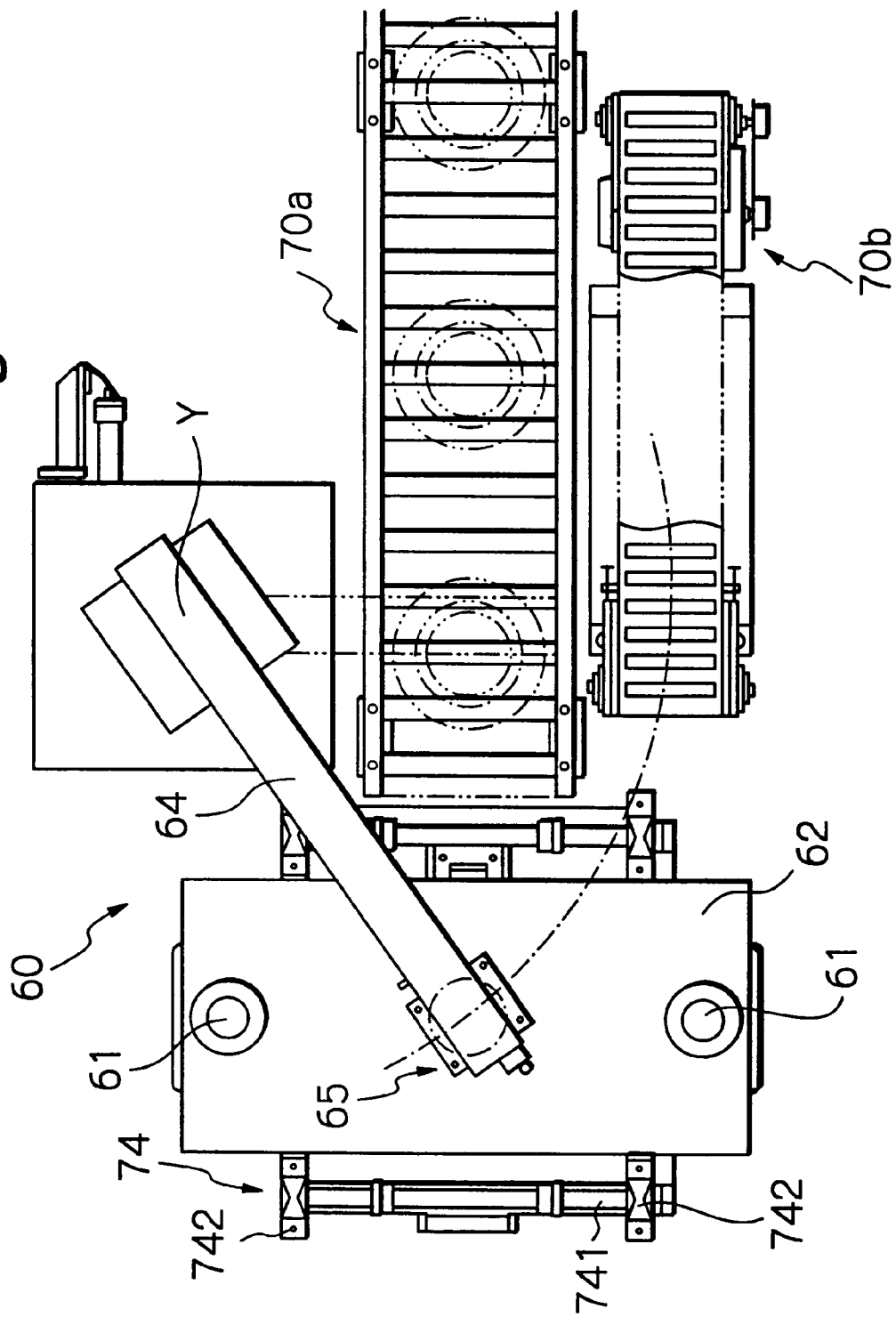
FIG. 31 is a plan view of the pushing-out unit of FIG. 30.

FIGS. 30 and 31 show the pushing-out unit 60 in greater detail. The pushing-out unit 60 includes a pair of vertical posts 61 disposed on opposite sides of the fourth conveyor section 74 at positions next to the fourth gate 53a; a movable block 62 guided by the vertical posts 61 for vertical displacement and disposed above the fourth conveyor section 74; a pushing-out rod 63 disposed below the conveyor section 74 and having an axis extending in vertical direction and crossing with the centerline of the transportation path of the sintering mold conveyed by the conveyor section 74, the pushing-out rod 63 being supported for vertical displacement and provided with an actuator (not shown) for displacing the pushing-out rod 63 in vertical direction; a horizontal swing arm 64 supported for swinging movement about a vertical axis Y—Y and driven to make swinging movement by a driving unit of a known type; and a gripping chuck 65 attached to the distal end of the swing arm 64. The movable block 62 is driven for vertical displacement by means of a lift unit of a known type (not shown), such as a unit using a hydraulic cylinder. The pushing-out rod 63 has a circular cross section with a diameter small enough to enter in the bore $\underline{b}$ of the sintering mold. The gripping chuck 65 includes a gripping claw so actuated as to grip the stack of the upper press core $\underline{m}$, the finished sintered product and the lower press core $\underline{e}$ when the stack is pushed out of and thus removed from the sintering mold. The gripping chuck 65 may be constructed and arranged with ease by using known components and in a known manner, so that its structure and functions are not described in more detail for simplicity. The movable block 62 has a vertical hole at the center thereof. The stack of the upper press core $\underline{m}$, the finished sintered product and the lower press core $\underline{e}$ is passed through the vertical hole of the movable block 62 when pushed up and removed from the sintering mold.

In operation, a tray J having a sintering mold a1 placed thereon, which has been cooled in the cooling unit 50, is conveyed by the fourth conveyor section 74 to reach a predetermined pushing-out position PP in the pushing-out unit 60 (FIG. 30), when the operation of the fourth conveyor section 74 is stopped so that the sintering mold is held at the pushing-out position PP. Then, the movable block 62 is lifted down to come into engagement with the top surface c of the sintering mold so as to secure the sintering mold to that position. Then, the pushing-out rod 63 is raised to push up the lower press core $\underline{e}$, so that the stack of the upper press core $\underline{m}$, the finished sintered product and the lower press core $\underline{e}$ is lifted up and released from the sintering mold. The stack thus released from the sintering mold is then gripped by the gripping chuck 65 and transferred thereby onto a conveyor 70b, which conveys the stack to the next process station. On the other hand, the sintering mold from which the stack is removed away is transferred from the fourth conveyor section 74 onto a conveyor 70a, which is disposed downstream of the fourth conveyor section 74 and conveys the sintering mold to the next process station. The conveyors 70a and 70b are roller conveyors.

The rollers 711, 721, 731 and 741 of the conveyor sections 71, 72, 73 and 74 each has a pair of flanged wheels, designated by 715, 725, 735 and 745, respectively, disposed on the associated roller and spaced from each other. The tray is conveyed on the wheels of the rollers, with opposite side edges of the tray being guided by the flanges of the rollers so that any sideward displacement of the tray on the conveyer is prevented. All the rollers 711, 721, 731 and 741 of the conveyor sections 71, 72, 73 and 74 are driven in synchronism with each other by means of a drive arrangement described below. Each of the rollers 711, 721, 731 and 741 has a pair of identical sprockets (designated by 713, 723, 733 and 743, respectively) mounted thereon at one end thereof. Any two sprockets mounted on two adjacent rollers are operatively connected by an endless chain (designated by 714, 724, 733 and 744, respectively) wound round the two sprockets, so that all the rollers are operatively connected by the endless chains. Further, one of the rollers is selected as a driven roller to be driven by a drive motor. In this embodiment, the most downstream (the leftmost, as seen in FIG. 22) of the rollers 731 of the third conveyor section 73 is selected to be driven by a drive motor 76. In this manner, all the rollers are driven in synchronism by the common drive motor 76. In accordance therewith, the distance between the pre-heating position HP and the sintering position SP, the distance between the sintering position SP and the cooling position CP and the distance between the cooling position CP and the pushing-out position PP are selected to be the same distance P. Alternatively, the conveyor sections 71, 72, 73 and 74 may be independently driven by individual drive motors. In such case, the distances need not be selected to the same distance.

Figure 32:
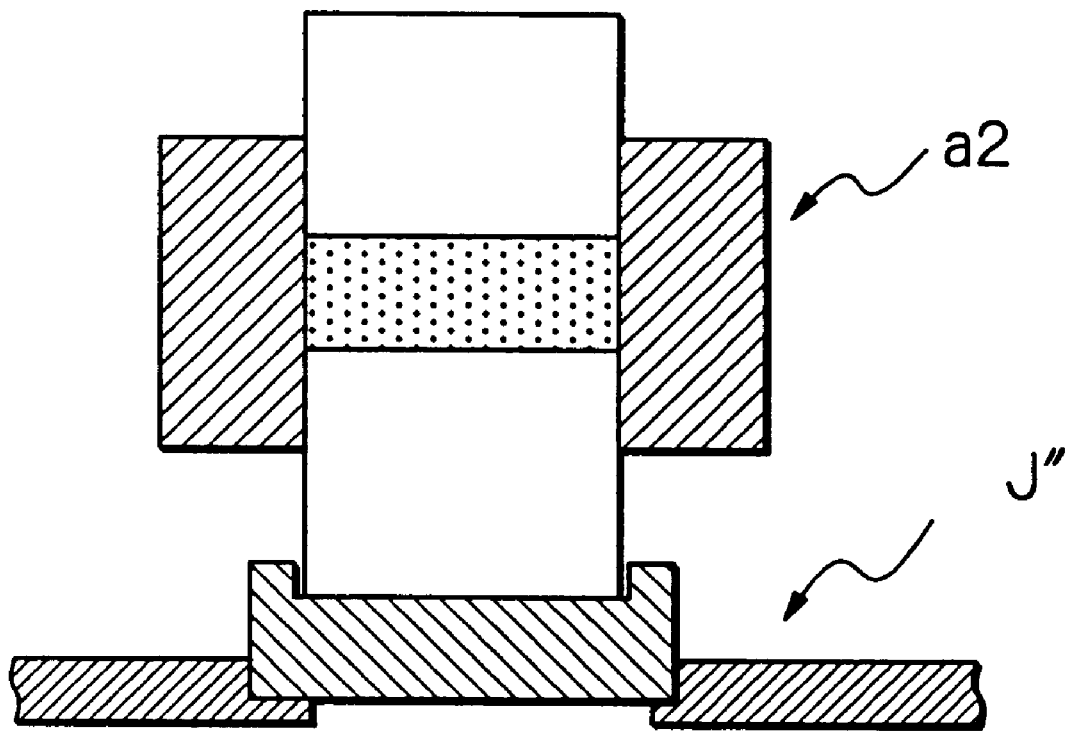
FIG. 32 is a section view of a sintering mold and a tray in accordance with a modified embodiment.

The power supply unit 90 includes the power supply circuitry for providing the sintering power output as well as the power supply circuitry for providing the pre-heating power output. The sintering power output is in the form of DC pulsed current having relatively low voltage level and relatively high current level. The voltage level may be, for example, less than 100 V and the current level greater than 6,000 A. The pre-heating power output may be in any form of electric output as long as it can provide necessary energy for pre-heating the sintering mold. Various circuitry for providing these functions are known in the art, so that the circuitry in the power supply unit 90 is not described in more detail for simplicity. The power supply unit 90 includes switches (not shown) for turning on/off the sintering power output and the pre-heating power output, respectively. The sintering mold used in the embodiment described above comprises a hollow cylindrical body having a bore with a circular cross section. Such shape of sintering mold is suited for fabrication of sintered products of a disk or cylindrical shape. In the case where sintered products of any other shape are to be fabricated, i.e., if the sintered products have, for example, an elliptical cross section or a rectangular cross section, sintering molds having a bore with the corresponding cross section are to be used together with upper and lower press cores also with the corresponding cross section. Further, in the embodiment described above, the bottom surface of the lower press core is held flush with the bottom surface of the sintering mold during the sintering process. Alternatively, as shown in FIG. 32, a modified sintering mold a2 and a modified lower press core may be used, in which the lower end of the lower press core is protruded downward from the bottom surface of the sintering mold a2 during the sintering process. In this case, a modified tray J" can be used to accommodate the protruded lower end of the lower press core.

Figure 33:
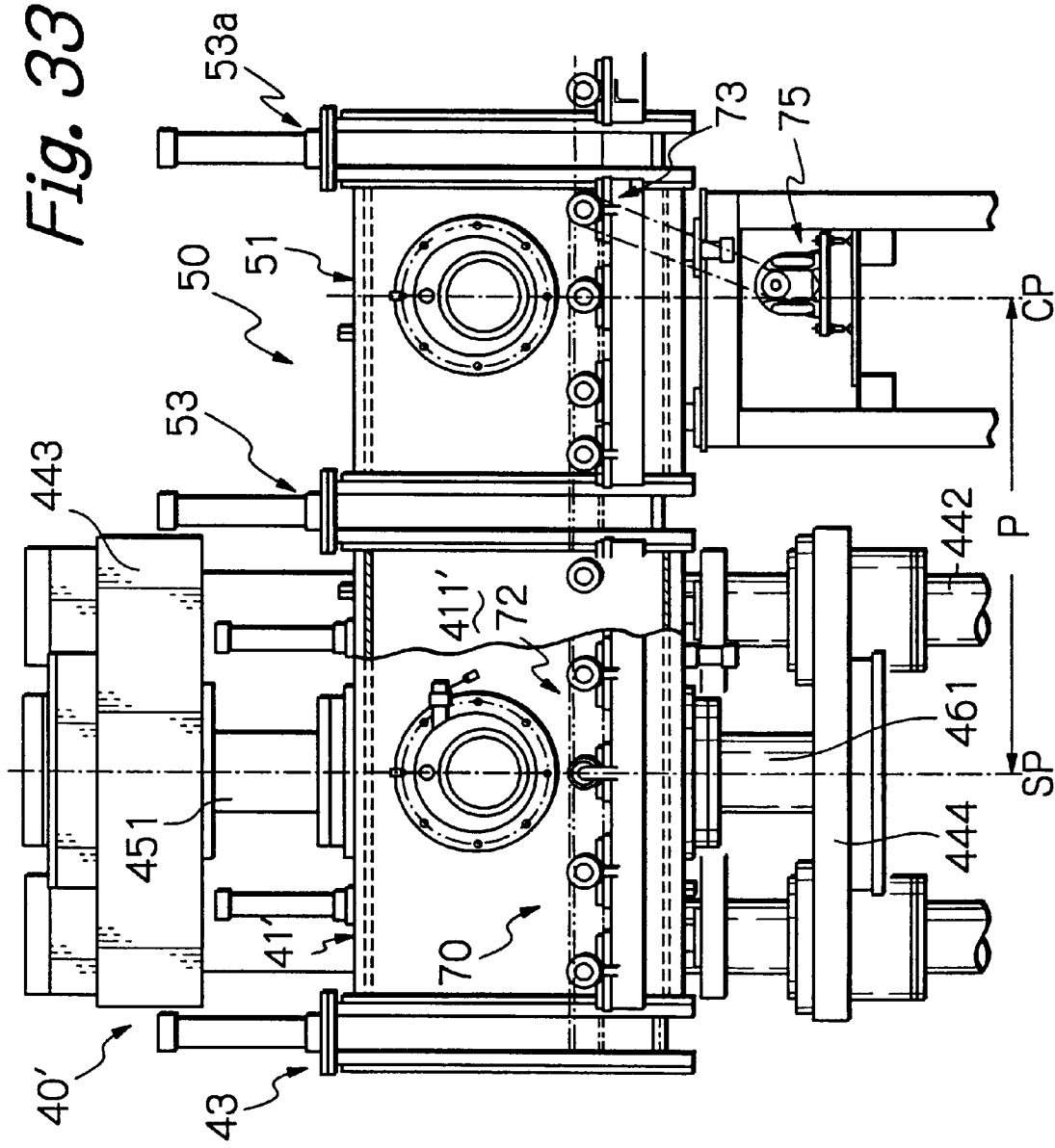
FIG. 33 is a side elevation view of another sintering system in which the pre-heating unit does not have its own housing.
Figure 34:
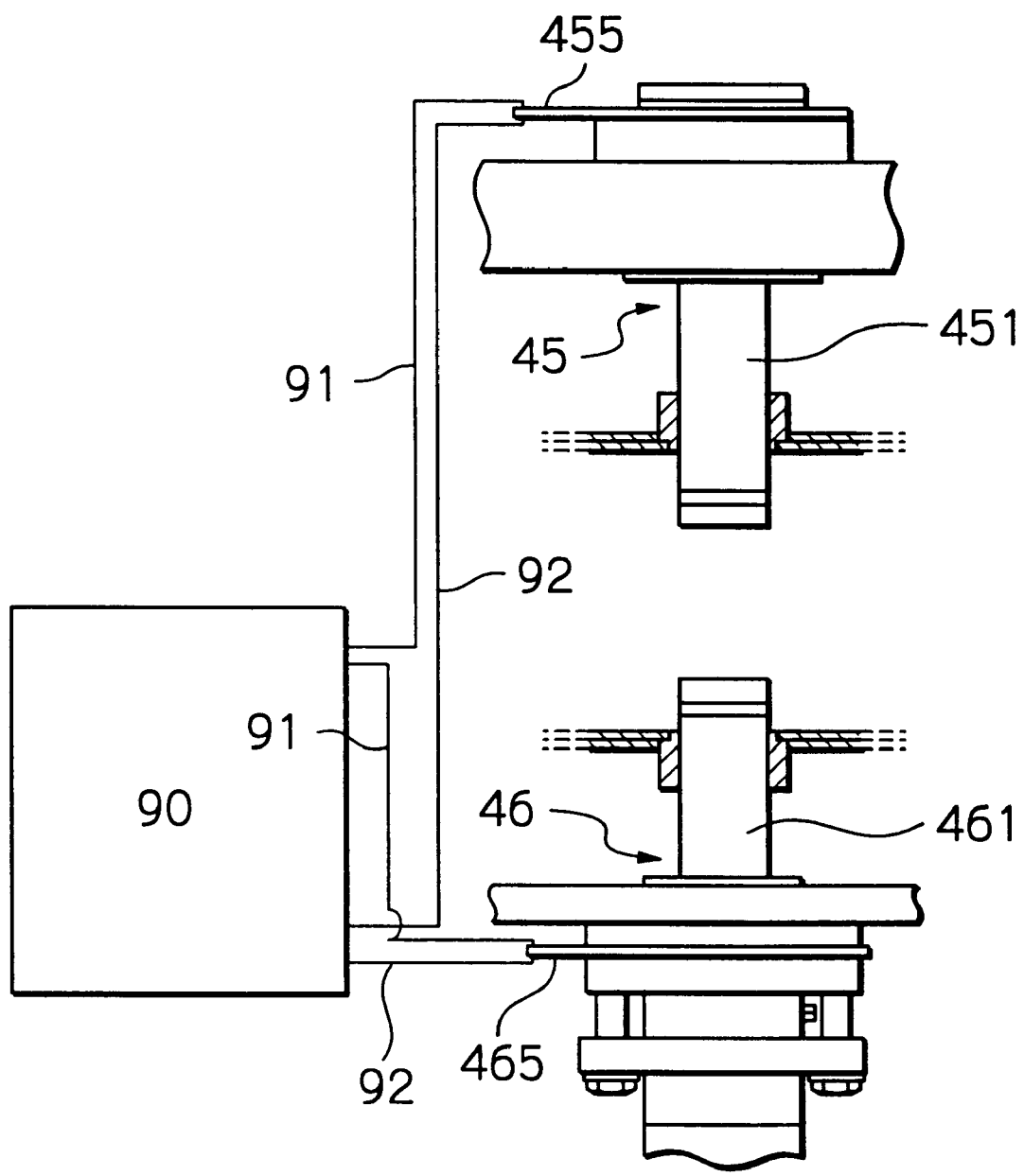
FIG. 34 is schematic elevation view of an arrangement in which a sintering unit and a pre-heating unit are combined into a single structure.

FIG. 33 shows a sintering system in accordance with a modified embodiment of the present invention. The sintering system shown differs from the sintering system described above in that it includes a pre-heating unit which does not have its own housing but is disposed in a modified sintering chamber 411', so that both the pre-heating and the sintering processes are carried out in the same chamber 411'. The remaining part of the sintering system shown in FIG. 33 is identical in structure and functions to the sintering system described above, and thus is not described in detail for simplicity. With the sintering system according to the modified embodiment in FIG. 33, the sintering unit 40 has a housing 41' defining the sintering chamber 411', which is capable of selective communication with the first atmosphere control unit 81 (FIG. 1) and the second atmosphere control unit 82, so that the sintering chamber 411' has an atmosphere therein which is controllable to be selectively one of two atmospheres, i.e., a pre-heating atmosphere (under control of the first atmosphere control unit 81) and a sintering atmosphere (under control of the second atmosphere control unit 82). The pre-heating of the sintering mold in the sintering chamber 411' may be carried out by using any of various heating techniques including: supplying hot gas into the sintering chamber; providing a heater in the sintering chamber and operating it to generate heat in the chamber; providing the electric current supply devices of FIG. 24 in the sintering chamber and using them to apply current to the sintering mold so as to generate resistive heat in the sintering mold; and any other techniques which could be used for pre-heating the sintering mold in the pre-heating chamber 311 in the embodiment described above. Alternatively, the pre-heating of the sintering mold in the sintering chamber may be carried out by providing and using a resistive heating mechanism, in which the pre-heating current (separately forms the sintering current) is applied to the sintering mold through the upper and lower electrodes 451 and 461 from the pre-heating power output circuitry. More specifically, as shown in FIG. 34, each of the upper and lower plunger electrodes 451 and 461 is capable of electrical connection to both of the sintering power output circuitry and the pre-heating power output circuitry in the power supply unit 90 through a pair of lines (designated by 91 and 92, respectively) and a switch (not shown), so that the pulsed current for sintering and the continuous current for pre-heating may be selectively supplied to the sintering mold. The method and system according to the modified embodiment eliminate the pre-heating housing, and thus are suitable for such a continuous fabrication process in which the time required for loading powder material into a sintering mold is nearly equal to the time required for pre-heating and sintering effected to a sintering mold, which may be the case when a significant number of powder material layers has to be formed in a sintering mold so that the powder material loading process requires relatively long time. However, the use of the method and system according to the modified embodiment is not limited to such applications but the method and system may be also used in ordinal electrical sintering process sequences.

The automatic electrical sintering system of the present invention may be provided with a central control unit for controlling general operations of the system, which may be a computer based control unit. By programming and inputting in the computer any necessary process parameters relating to the pulsed-current electrical sintering process, an optimum sintering process sequence may be achieved in a full-automatic manner. Each of the embodiments described above includes a single automatic powder material loading apparatus and a single sintering line of a pre-heating unit, a sintering unit and a pushing-out unit combined with each other. In this relation, it is also contemplated that a single such powder material loading apparatus is combined with two or more such sintering lines, or vice versa, depending on the comparison of the rate of powder material loading process and that of the sintering process. Further, two or more such powder material loading apparatus and two or more such sintering lines may be combined so that different sintered products may be fabricated in parallel operations in a continuous fabrication process.

As clearly understood from the above, the following advantages may be provided by the present invention.

(1) Process steps of loading powder material into a sintering mold, effecting electrical sintering to the powder material and removing the sintered product from the sintering mold be carried out in an automated manner and in a continuous fabrication process.

(2) Sintered products having gradient functionality may be mass-produced in an automated manner.

(3) High-quality sintered products may be obtained with good reproducibility in an automated manner and in a continuous fabrication process because different powder materials may be filled in a sintering mold to form respective layers of the powder materials with highly uniform thickness' and with high precision.

Having described the present invention with reference to the preferred embodiments thereof, it is to be understood that the present invention is not limited to the disclosed embodiments, but may be embodied in various other forms without departing from the spirit and the scope of the present invention as defined by the appended claims.

What is claimed is:

1. A method of automatically loading powder material into a sintering mold and subsequently effecting electrical sintering to said powder material in said sintering mold, said method comprising the steps of:

fitting a lower press core into a bore formed in said sintering mold, while allowing displacement of said lower press core in said bore;

filling different powder materials, which differ from one another in at least one of properties including component(s) of powder material, percentages of components, particle size and particle shape, into said bore to form respective powder layers of said different powder materials in said bore, while displacing said lower press core downward in said bore sequentially and in a stepwise manner, such that the position of a top surface of said lower press core from a top surface of said sintering mold is adjusted depending on the thickness of said respective layers of said different powder materials being filled into said bore;

preliminarily pressing at a desired pressure said powder layers of said different powder materials;

displacing said pressed powder layers together with said lower press core relative to said sintering mold so as to position said powder layers to a desired position in said sintering mold;

fitting an upper press core into said bore of said sintering mold and onto said powder layers;

pre-heating to a desired temperature said sintering mold with said powder layers formed therein and with said upper press core fitted therein; and effecting electrical sintering to said powder layers by: operating upper and lower conductive members so as to press at a desired pressure said upper press core and said lower press core fitted in said sintering mold having been pre-heated; and simultaneously applying sintering current to said powder layers through said upper and lower conductive members.

2. The method according to claim 1, wherein:
said pressing step is carried out each time when one of said different powder materials is filled into said sintering mold to form one of said layers.

3. The method according to claim 1, wherein:
said pressing step is carried out each time when successive two or more of said different powder materials are filled into said sintering mold to form two or more of said layers.

4. The method according to claim 1, further comprising the step of:
effecting forced cooling to said sintering mold subsequent to said electrical sintering step.

5. The method according to claim 1, wherein:
said pre-heating step comprises applying pre-heating current to said sintering mold.

6. The method according to claim 1, wherein:
said sintering current applying step comprises: causing said lower conductive member to come into contact with only a bottom surface of said lower press core; and applying DC pulsed current to said powder layers through said upper and lower conductive members.

7. The method according to claim 1, wherein:
said sintering current applying step comprises: causing said lower conductive member to come into contact with a bottom surface of said lower press core and a bottom surface of said sintering mold; and applying DC pulsed current to said powder layers through said upper and lower conductive members.

8. An automatic electrical sintering system for automatically loading powder material into a sintering mold and subsequently effecting electrical sintering to said powder material in said sintering mold, comprising:
an automatic powder material loading apparatus for automatically loading a desired amount of powder material into said sintering mold and pressing said powder material;
a pre-heating unit disposed along a transportation path of said sintering mold and downstream of said automatic powder material loading apparatus, for pre-heating said sintering mold;
a sintering unit including conductive members for contacting a pair of press cores fitted in said sintering mold pre-heated by said pre-heating unit, with said powder material being held between said press cores, said sintering unit further including means for applying sintering current to said powder material through said plunger electrodes to effect electrical sintering to said powder material in said sintering mold; and
a conveyor for conveying through said sintering unit said sintering mold sent from said automatic powder material loading apparatus;
wherein said sintering unit includes a substantially gas-tight chamber.

9. An automatic electrical sintering system according to claim 8, wherein:
said pre-heating unit is disposed in said chamber of said sintering unit; and
said chamber of said sintering unit has an atmosphere therein which is controllable to be selectively one of atmospheres including a pre-heating atmosphere and a sintering atmosphere.

10. An automatic electrical sintering system according to claim 8, wherein:
said pre-heating unit includes its own chamber; and
said chamber of said sintering unit and said chamber of said pre-heating unit have respective atmospheres therein which are individually controllable.

11. An automatic electrical sintering system according to claim 8, further comprising:
a cooling unit for effecting forced cooling to said sintering mold having been subjected to sintering process, said cooling unit including its own chamber.

12. An automatic electrical sintering system according to claim 8, wherein:
each of said chambers includes an entrance and an exit for said sintering mold to be conveyed therethrough into and out of that chamber; and
each of said entrance and said exit is provided with a gate for isolating the inside of that chamber from the outside of that chamber.

13. An automatic electrical sintering system according to claim 8, wherein:
said automatic powder material loading apparatus serves to fill different powder materials, which differ from one another in at least one of properties including component(s) of powder material, percentages of components, particle size and particle shape, into said bore of said sintering mold to form respective layers of said different powder materials one on another in said sintering mold.

14. An automatic electrical sintering system according to claim 13, wherein:
said automatic powder material loading apparatus comprises:
a conveyor system for conveying said sintering mold;
a powder filling mechanism for filling an amount of powder material into said sintering mold at a powder filling position defined along a transportation path of said sintering mold conveyed by said conveyor system; and
a press unit for pressing at a desired pressure the amount of powder material in said sintering mold;
wherein a plurality of said powder filling mechanisms are provided along said transportation path, each having said powder filling position.

15. An automatic electrical sintering system according to claim 13, wherein:
said automatic powder material loading apparatus comprises:
a conveyor system for conveying said sintering mold;
a powder filling mechanism for filling an amount of powder material into said sintering mold at a powder filling position defined along a transportation path of said sintering mold conveyed by said conveyor system; and
a press unit for pressing at a desired pressure the amount of powder material in said sintering mold;
wherein said powder filling mechanism comprises:
a rotary table capable of indexing movement about an axis; and
a plurality of hoppers provided on said rotary table at circumferentially spaced positions with respect to said axis of said rotary table, said plurality of hoppers storing said different powder materials therein, respectively, and capable of individual movement relative to said rotary table;
wherein one of said plurality of hoppers is brought to said powder filling position by indexing movement of said rotary table.

16. An automatic electrical sintering system according to claim 8, wherein:

said pre-heating unit comprises:

a pair of contact members capable of selective contact with outer side surface of said sintering mold, wherein pre-heating current is applied to said sintering mold through said contact members.

17. An automatic electrical sintering system according to claim 8, wherein:

said pair of press cores include an upper press core and a lower press core;

said pair of conductive members include an upper plunger and a lower plunger electrode; and said lower electrode is capable of contact with only the lower press core fitted in said sintering mold.

18. An automatic electrical sintering system according to claim 8, wherein:

said pair of press cores include an upper press core and a lower press core;

said pair of conductive members include an upper electrode and a lower electrode;

said lower electrode is capable of contact with a bottom surface of said sintering mold and a bottom surface of said lower press core fitted in said sintering mold.

19. An automatic electrical sintering system according to claim 8, further comprising:

a pushing-out unit for simultaneously pushing out and removing said upper press core, said lower press core and a sintered product from said sintering mold having been subjected to sintering process.

20. An automatic electrical sintering system for automatically loading powder material into a sintering mold and subsequently effecting electrical sintering to said powder material in said sintering mold, comprising:

an automatic powder material loading apparatus for automatically loading a desired amount of powder material into said sintering mold and pressing said powder material;

a sintering unit disposed along a transportation path of said sintering mold and downstream of said automatic powder material loading apparatus and including conductive members capable of contact with a pair of press cores fitted in said sintering mold, with said powder material being held between said press cores, said sintering unit applying sintering current to said powder compact through said conductive members to effect electrical sintering to said powder material in said sintering mold;

a conveyor for conveying through said sintering unit said sintering mold sent from said automatic powder material loading apparatus;

a sintering power supply for providing sintering current; and a pre-heating power supply for providing pre-heating current;

wherein said conductive members are capable of selective electrical connection to said sintering power supply and said pre-heating power supply, so that said pre-heating current and said sintering current is selectively applicable to said sintering mold through said conductive members; and wherein said sintering unit includes a substantially gas-tight chamber having an atmosphere therein which is controllable to be selectively one of atmospheres including a pre-heating atmosphere and a sintering atmosphere.

* * * * *